United States Patent [19]

Noda et al.

[11] 3,922,275

[45] Nov. 25, 1975

[54] PYRIDO[2,3-D] PYRIMIDINE-2,4(1H,3H)-DIONES

[75] Inventors: Kanji Noda, Chikushino; Akira Nakagawa, Tosu; Hiroyuki Ide, Fukuoka, all of Japan

[73] Assignee: Hisamitsu Pharmaceutical Co., Inc., Tosu, Japan

[22] Filed: Oct. 8, 1974

[21] Appl. No.: 513,079

Related U.S. Application Data

[63] Continuation-in-part of Ser. No. 375,879, July 2, 1973, abandoned.

[30] Foreign Application Priority Data
Nov. 9, 1972  Japan............................... 47-113161
Nov. 10, 1972  Japan............................... 47-113383

[52] U.S. Cl. ............................ 260/256.4 F; 424/251
[51] Int. Cl.² ....................................... C07D 239/70

[58] Field of Search............................... 260/256.4 F

[56] References Cited
FOREIGN PATENTS OR APPLICATIONS
2,334,266  1/1974  Germany..................... 260/256.4 F

*Primary Examiner*—Donald G. Daus
*Assistant Examiner*—D. B. Springer
*Attorney, Agent, or Firm*—Browdy and Neimark

[57] ABSTRACT

The compounds, pyrido[2,3-d]pyrimidine-2,4(1H,3H)-diones of the present invention have such pharmocological activities as anti-inflammatory, anti-ulcerous, analgetic, antipyretic, antihistaminic and central nervous system depressive activities, and are remarkably useful as anti-inflammatory agents, analgesics and central nervous system depressants.

78 Claims, No Drawings

PYRIDO[2,3-D] PYRIMIDINE-2,4(1H,3H)-DIONES

This is a continuation-in-part of copending application Ser. No. 375,879 filed July 2, 1973, now abandoned.

DETAILED DESCRIPTION

The present invention pertains to the pyrido[2,3-d]pyridimidine-2,4(1H,3H)-diones represented by the general formula:

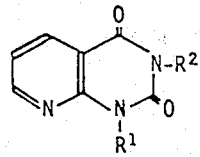 [A]

wherein $R^1$ denotes an aryl, aralkyl group or a cyclohexyl radical, and $R^2$ denotes a hydrogen atom, an alkyl, substituted alkyl, unsaturated alkyl, alkoxycarbonyl or substituted unsaturated alkyl group.

In the preferred subgenus of the present invention $R^1$ represents
1. a phenyl radical,
2. a phenyl radical substituted with
   a. one or two halogen atoms,
   b. one or two lower alkyl groups,
   c. a halogen atom and a lower alkyl group,
   d. a lower alkoxy group, or
   e. one or two trifluoromethyl radicals,
3. a benzyl radical,
4. a halogen-substituted benzyl radical, or
5. a cyclohexyl radical.

More specifically in the preferred compound $R^1$ denotes phenyl, o-fluorophenyl, m-fluorophenyl, p-fluorophenyl, o-chlorophenyl, m-chlorophenyl, p-chlorophenyl, m-bromophenyl, p-bromophenyl, m-iodophenyl, o-tolyl, m-tolyl, m-methoxyphenyl, p-ethoxyphenyl, 2,3-xylyl, 2-methyl-3-chlorophenyl, 3,4-dichlorophenyl, m-trifluoromethylphenyl, p-trifluoromethylphenyl, 3,5-ditrifluoromethylphenyl, benzyl, p-chlorobenzyl and cyclohexyl.

Numerous compounds for use as anti-inflammatory agents, analgesics and central nervous system depressants are known, and particularly phenylbutazone, flufenamic acid, mefenamic acid, aminopyrine, diazepam, nitrazepam, and methaqualone are generally in use. These medicines, however, are often insufficiently effective or present such side reactions as gastroenteric trouble, dermatitis, renal paralysis, nausea, dizziness, tinnitus and drowsiness, and so superior anti-inflammatory agents, analgesics and central nervous system depressants are being sought.

The compounds of the present invention have been proven to have such pharmacological activities as anti-inflammatory, analgetic, anti-ulcerous, antipyretic, antihistaminic and central nervous system depressive activities without presenting substantial toxicity and are remarkably useful as antiinflammatory agents, analgesics and central nervous system depressants.

U.S. Pat. Nos. 3,272,816 and No. 3,296,447 disclosed 7-amino-2,4-dioxo-1,2,3,4-tetrahydropyrido[2,3-d]pyrimidines, but the compounds of the present invention, which are quite different from the former in that they have no amino radical in position-7 and are different in the structure of other side chains, are superior to the former compounds in the anti-inflammatory, analgetic and central nervous system depressive activities.

The compounds of the present invention are pyrido[2,3-d]pyrimidine-2,4(1H,3H)-diones represented by the general formula:

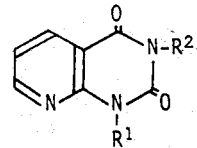 [A]

wherein $R^1$ denotes an aryl, aralkyl group or a cyclohexyl radical, and $R^2$ denotes a hydrogen atom, an alkyl, substituted alkyl, unsaturated alkyl, alkoxycarbonyl or substituted unsaturated alkyl group, and more particularly $R^1$ is selected from the group consisting of

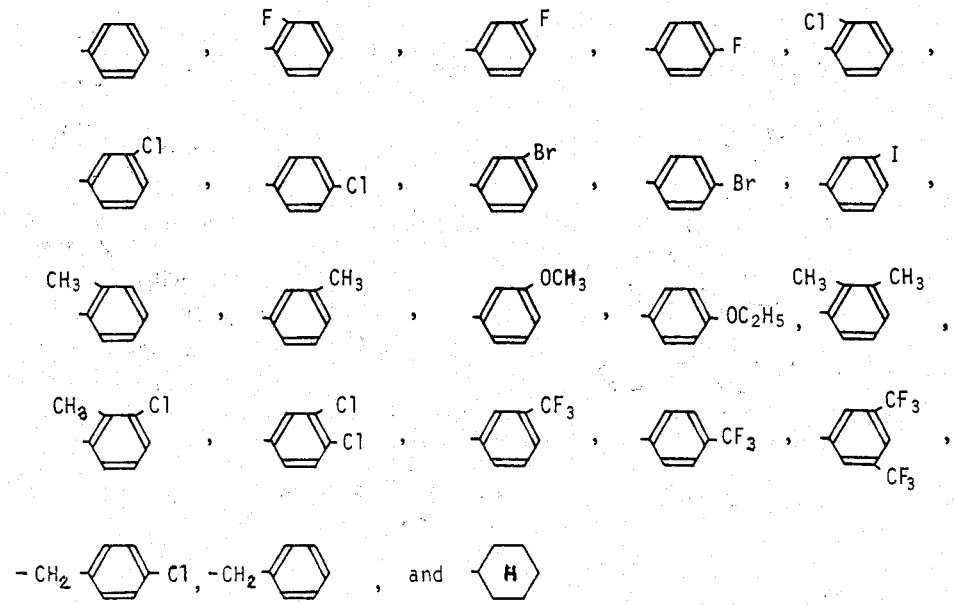

and R² is selected from the group consisting of   -H, -CH₃, -C₂H₅, -CH₂CH₂CH₃,

-CH(CH₃)₂, -CH₂CH₂CH₂CH₃, -CH₂CH(CH₃)₂, -CH₂CH₂CH₂CH₂CH₃, -CH₂◁, -CHF₂, -CF₃,

-CH₂CH₂F, -CH₂CH₂Cl, -CH₂CH₂Br, -CH₂CF₃, -CH₂CH₂CH₂Cl, -CH₂CH=CH₂, -CH₂C(CH₃)=CH₂,

-CH₂CH=C(CH₃)₂, -CH₂CH=CHCl, -CH₂C≡CH, -CH₂CH₂OH, -CH₂CH₂CH₂OH, -CH₂CH(OH)CH₃,

-CH₂CH(OH)CH₂OH, -CH₂CH(OH)CH₂Cl, -CH₂CH₂OCOCH₃, -CH₂OCH₃, -CH₂OC₂H₅, -CH₂CH₂OC₂H₅,

-CH₂CH₂OCH=CH₂, -CH₂CH₂OCH₂CH₂OH, -CH₂CH(Cl)OC₂H₅, -CH₂CH-CH₂ (epoxide),

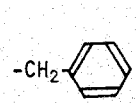 , 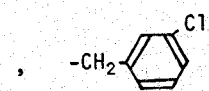 , 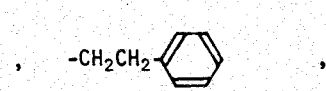 ,

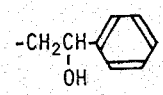 , -CH₂COCH₃ , 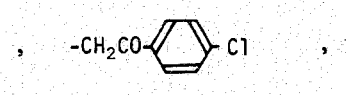 ,

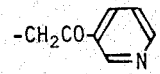 , -COOC₂H₅ , -CH₂COOH ,

-CH(CH₃)COOH , -CH₂COOC₂H₅ , -CH(CH₃)COOC₂H₅ ,

-CH(C₂H₅)COOC₂H₅ , -CH₂CH₂OCOOC₂H₅ , -CH₂CONH₂ ,

-CH₂CN , -CH₂CH₂N(C₂H₅)₂ , 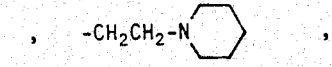 ,

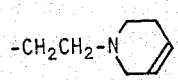 , 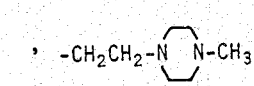 , 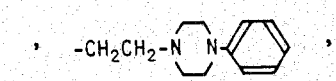 ,

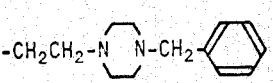 , -CH₂CH₂CH₂N(CH₃)₂ , 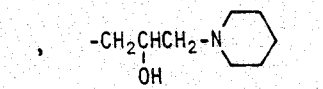 ,

-CH₂CH₂NHCONH₂ , 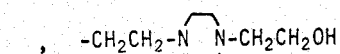

and

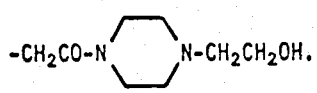

The compounds of the present invention can be prepared in high yields by two independent processes as will be described hereinafter.

PREPARATION SERIES I

Reaction scheme [I]:

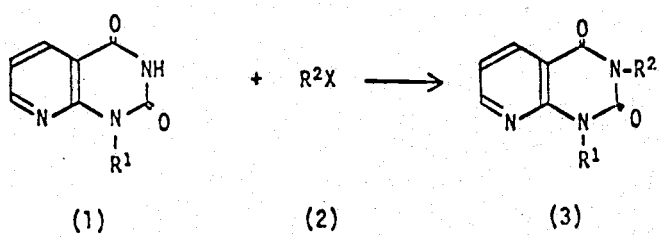

wherein $R^1$ and $R^2$ are the same notations as in the above formula [A], and X denotes a halogen atom or an arylsulfonyloxy group; examples of $R^2X$ include ethyl iodide, propargyl bromide, allyl bromide and ethyl benzenesulfonate.

Reaction scheme [II]:

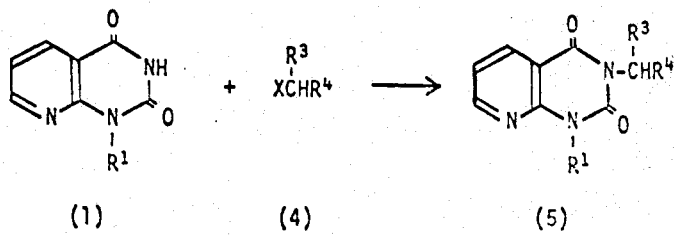

wherein $R^1$ is the same notation as in the above, $R^3$ denotes a hydrogen atom or a lower alkyl group, $R^4$ denotes a carbamoyl, cyano radical or an alkoxycarbonyl group and X denotes a halogen atom. The examples of general formula (4) include ethyl chloroacetate, chloroacetamide and chloroacetonitrile. The term "lower" when used to describe alkyl, alkoxy, etc. groups throughout the present specification and claims refers to $C_{1-5}$.

Reaction scheme [III]:

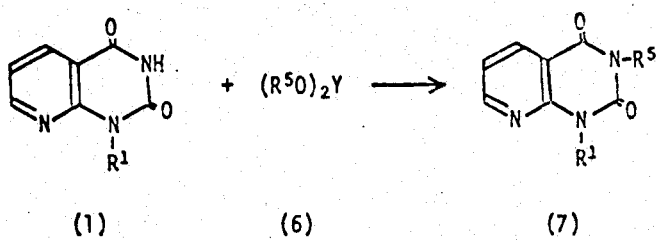

wherein $R^1$ is the same notation as in the above, $R^5$ denotes a lower alkyl, substituted alkyl or unsaturated alkyl group and Y denotes a carbonyl (—CO—), sulfonyl (—SO$_2$—) or oxalyl (—CO—CO—) radical.

The examples of general formula (6) include dimethylsulfate, diethyl carbonate and diethyl oxalate.

Reaction scheme [IV]:

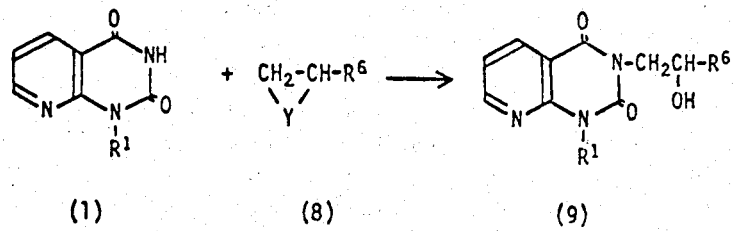

wherein $R^1$ is the same notation as in the above, $R^6$ denotes a hydrogen atom, a lower alkyl, halogenated lower alkyl, lower unsaturated alkyl or aryl group, and Y denotes an oxo (—O—), carbonyldioxo (—O—CO—O—) or sulfinyldioxo (—O—SO—O—) radical. The example of general formula (8) include glycol sulfide, epichlorohydrin, propylene oxide and ethylene carbonate.

Reaction Scheme [V]:

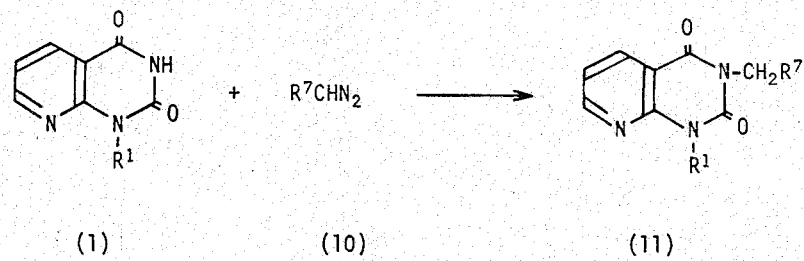

(1)        (10)        (11)

wherein $R^1$ is the same notation as in the above, $R^7$ denotes a hydrogen atom or a lower alkyl group. The examples of general formula (10) include diazomethane and diazoethane.

The starting materials, 1-substituted-pyrido[2,3-d]pyrimidine-2,4 (1H,3H)-dione derivatives as represented by general formula (1) are prepared in excellent yield, when 2-aminonicotinamide derivative is reacted with diethyl carbonate in the presence of sodium ethylate.

The starting materials as represented by general formula (1) may be reacted with the aforesaid reagents of general formulas (2), (4), (6), (8) and (10). These reactions are preferably carried out in a solvent such as toluene, xylene, tetrahydrofuran, dioxane or dimethylformamide. The reactions as shown in the schemes [I], [II] and [III] should preferably be processed in the presence of a metallic compound such as sodium alcoholate, sodium amide or sodium hydride or an inorganic salt such as alkali hydroxide or carbonate. The employment of the said metallic compounds is particularly advantageous in order to obtain the highest yield of the object product.

The desirable temperature is not critical but may be ambient or elevated temperature. Since the reaction develops very rapidly, room temperature is sufficient for the reaction and heating is not necessary. The period of reaction may range from 30 minutes to 3 hours, and may be shortened by applying mild heating. On the other hand, when oxalic acid diesters and dialkyl carbonates are employed as N-alkylation agent in reaction scheme [III], the reaction should preferably be developed in an autoclave at a temperature of 150°–240°C.

The reaction solvent is distilled off from the reaction mixture and the residue is mixed with water to precipitate the crystals of object compound. Then the obtained crystals may be easily recrystallized from methanol or similar solvent for purification.

The obtained compound may be further converted into an addition salt combined with an inorganic or organic acid. Popular examples of such addition salts include hydrochloride, sulfate, phosphate, acetate, benzoate, lactate, succinate, citrate, tartrate, fumarate, malonate and maleate. These salts are included within the scope of the present invention, of course, and this conversion into salts serves to improve the solubility and stability of the products.

In the above reaction scheme [II], when the compound of general formula (5) produced by the reaction of compound (1) with compound (4) contains in $R^4$ a carbamoyl, cyano radical or an alkoxycarbonyl group, these compounds may further be hydrolyzed, if desired, either by an alkali such as caustic alkali and alkali carbonate or by an acid such as hydrochloric, sulfuric and acetic acids into fatty acid derivatives.

In reaction scheme [IV], the reaction develops in a basic solvent at room temperature, but the reaction is finished in a short time when heated. On the other hand, in reaction scheme [V], the reaction is finished without any catalyst in an inert solvent when allowed to stand at room temperature.

PREPARATION SERIES [II]

Reaction scheme [VI]:

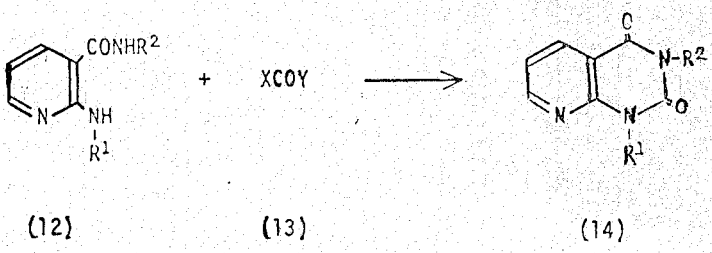

(12)        (13)        (14)

wherein $R^1$ and $R^2$ are the same notations as above, and X and Y denote a halogen atom, a lower alkoxy, amino group or an imidazolyl radical.

The examples of general formula (13) include urea, methylurea, diethylurea, N-propylurethane, 1,1'-carbonyldiimidazole, phosgene, ethyl chlorocarbonate and diethyl carbonate.

Reaction scheme [VII]

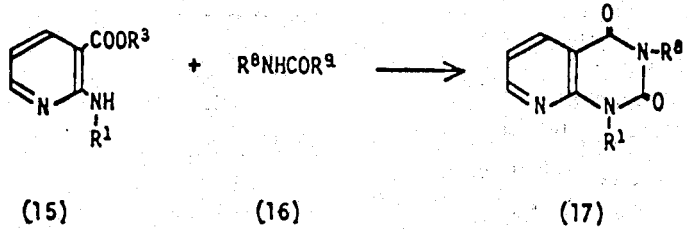

wherein $R^1$ and $R^3$ are the same notation as above, $R^8$ denotes a hydrogen atom, a lower alkyl or lower unsaturated alkyl group and $R^9$ denotes an amino or lower alkoxy group. The examples of general formula (16) include urea, diethylurea and N-propylurethane.

The reactions of these schemes [VI] and [VII] are smoothly developed under similar conditions and generally in an organic solvent such as dimethylformamide, diglyme, tetrahydrofuran or alcohols, but are preferably performed in the presence of a metallic compound such as metallic sodium, sodium amide, sodium hydride or an organic base such as trialkylamine and pyridine or an inorganic base such as alkali hydroxide and carbonate. The first-mentioned metallic compounds are most effective to enhance the yield of product. The reaction temperature is not critical and may be either ambient or elevated temperature. However, when heated to 50°–120°C, the reaction time is shortened. The reaction solvent is distilled off from the reaction mixture, and the residual crystals are refined by recrystallization from a solvent such as methanol.

Thus obtained compound may further be converted into an inorganic salt such as hydrochloride, phosphate, sulfate or an organic salt such as acetate, lactate, succinate, tartrate, fumarate and maleate by one of conventional techniques.

COMPOUNDS

The compounds of the present invention can be prepared by one of those processes as described in Preparation Series I and II. Some examples of these compounds and their melting points are shown in Table I.

Table I

The Examples of the Compounds Obtained by the Present Invention

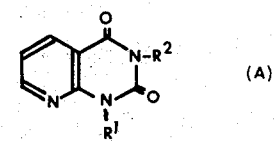

(A)

| Compound No. | $R^1$ | $R^2$ | Melting point(°C) |
|---|---|---|---|
| 1 | ⌬-CF₃ | —H | 259–260 |
| 2 | " | —CH₃ | 224–225 |
| 3 | " | —C₂H₅ | 160–161 |
| 4 | " | —CH₂CH₂CH₃ | 139–140 |
| 5 | " | —CH(CH₃)CH₃ | 151–153 |
| 6 | " | —CH₂CH₂CH₂CH₃ | 153–154 |
| 7 | " | —CH₂CH=CH₂ | 135–136 |

Table I-continued

The Examples of the Compounds Obtained by the Present Invention

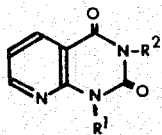

(A)

| Compound No. | R¹ | R² | Melting point (°C) |
|---|---|---|---|
| 8 | '' | —CH₂C=CH₂ | 130–131 |
| 9 | '' | —CH₂CH=CHCl | 134–135 |
| 10 | '' | —CH₂C≡CH | 177–178 |
| 11 | '' | —CH₂CH₂Cl | 167–168 |
| 12 | '' | —CH₂CH₂Br | 158–160 |
| 13 | '' | —CH₂CH₂CH₂Cl | 142–143 |
| 14 | '' | —CH₂CH₂OH | 142–143 |
| 15 | '' | —CH₂CH₂CH₂OH | 116–117 |
| 16 | '' | —CH₂CH(OH)—CH₃ | 169–170 |
| 17 | ⌬-CF₃ | —CH₂CH(OH)—CH₂OH | 170–171 |
| 18 | '' | —CH₂CH(OH)—CH₂Cl | 156–157 |
| 19 | '' | —CH₂CH₂OCOCH₃ | 140–141 |
| 20 | '' | —CH₂OCH₃ | 135–136 |
| 21 | '' | —CH₂OC₂H₅ | 162–163 |
| 22 | '' | —CH₂CH₂OC₂H₅ | 140–141 |
| 23 | '' | —CH₂CH₂OCH=CH₂ | 150–152 |
| 24 | '' | —CH₂CH₂OCH₂CH₂OH | 135–136 |
| 25 | '' | —CH₂CH(Cl)OC₂H₅ | 126–128 |
| 26 | '' | —CH₂—CH—CH₂ (epoxide) | 161–163 |
| 27 | '' | —CH₂-⌬ | 171–172 |
| 28 | '' | —CH₂-⌬-Cl | 146–147 |
| 29 | '' | —CH₂CH₂-⌬ | 184–185 |
| 30 | '' | —CH₂—CH(OH)-⌬ | 207–208 |
| 31 | '' | —CH₂COCH₃ | 185–187 |
| 32 | '' | —CH₂CO-⌬-Cl | 199–200 |
| 33 | '' | —CH₂CO-⌬(N) | 207–208 |
| 34 | '' | —COOC₂H₅ | 205–207 |

Table I-continued

The Examples of the Compounds
Obtained by the Present Invention (A)

| Compound No. | R¹ | R² | Melting point(°C) |
|---|---|---|---|
| 35 | " | —CH₂COOH | 186–188 |
| 36 | " | —CH(CH₃)COOH | 202–204 |
| 37 | (phenyl-CF₃) | —CH₂COOC₂H₅ | 153–154 |
| 38 | " | —CH(CH₃)COOC₂H₅ | oil |
| 39 | " | —CH₂CONH₂ | 254–256 |
| 40 | " | —CH₂CN | 219–220 |
| 41 | " | —CH₂CH₂N(C₂H₅)₂ | 239–240 (Hydrochloride) |
| 42 | " | —CH₂CH₂—N(piperidyl) | 224–225 (Maleate) |
| 43 | " | —CH₂CH₂—N(tetrahydropyridyl) | 246–248 (Hydrochloride) |
| 44 | " | —CH₂CH₂—N(piperazinyl)—CH₃ | 137–139 |
| 45 | " | —CH₂CH₂—N(piperazinyl)—N-phenyl | 160–161 |
| 46 | " | —CH₂CH₂—N(piperazinyl)—N-CH₂-phenyl | 155–156 |
| 47 | " | —CH₂CH₂CH₂N(CH₃)₂ | 143–144 (Hydrochloride) |
| 48 | " | —CH₂CH(OH)CH₂—N(piperidyl) | 220–222 (Hydrochloride) |
| 49 | " | —CH₂CH₂NHCONH₂ | 236–238 |
| 50 | " | —CH₂CH₂—N(piperazinyl)—CH₂CH₂OH | 161–162 |
| 51 | " | —CH₂CO—N(piperazinyl)—CH₂CH₂OH | 147–149 |
| 52 | (phenyl-CF₃) | —H | 315–316 |
| 53 | " | —CH₃ | 224–226 |
| 54 | " | —C₂H₅ | 214–216 |
| 55 | " | —CH₂CH=CH₂ | 173–175 |
| 56 | " | —CH₂C≡CH | 173–175 |
| 57 | (phenyl-CF₃) | —CH₂CH₂OH | 209–211 |

TABLE I-continued

The Examples of the Compounds Obtained by the Present Invention

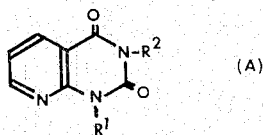

| Compound No. | R¹ | R² | Melting point(°C) |
|---|---|---|---|
| 58 | 3,5-bis(CF₃)-phenyl | —H | 288–289 |
| 59 | " | —C₂H₅ | 222–224 |
| 60 | " | —CH₂CH₂OH | 211–212 |
| 61 | phenyl | —H | above 315 |
| 62 | " | —CH₃ | 251–252 |
| 63 | " | —C₂H₅ | 192–193 |
| 64 | " | —CH₂CH₂CH₃ | 169–170 |
| 65 | " | —CH₂CH=CH₂ | 172–173 |
| 66 | " | —CH₂C≡CH | 239–240 |
| 67 | " | —CH₂CH₂Cl | 192–194 |
| 68 | " | —CH₂CH₂OH | 227–228 |
| 69 | " | —CH₂CH₂CH₂OH | 169–170 |
| 70 | " | —CH₂CH₂OCOCH₃ | 192–193 |
| 71 | " | —CH₂OCH₃ | 150–152 |
| 72 | " | —CH₂OC₂H₅ | 160–161 |
| 73 | " | —CH₂CH₂OC₂H₅ | 157–158 |
| 74 | " | —CH₂COOC₂H₅ | 194–195 |
| 75 | 2-F-phenyl | —H | 270–271 |
| 76 | " | —CH₃ | 244–245 |
| 77 | 2-F-phenyl | —C₂H₅ | 180–181 |
| 78 | " | —CH₂CH=CH₂ | 170–172 |
| 79 | " | —CH₂C≡CH | 215–216 |
| 80 | " | —CH₂CH₂OH | 187–188 |
| 81 | " | —CH₂CH₂OCOCH₃ | 166–167 |
| 82 | " | —CH₂OCH₃ | 152–153 |
| 83 | " | —CH₂CH₂OC₂H₅ | 179–180 |
| 84 | " | —CH₂COOC₂H₅ | 164–165 |
| 85 | 3-F-phenyl | —H | above 315 |
| 86 | " | —CH₃ | 197–198 |
| 87 | " | —C₂H₅ | 164–165 |
| 88 | " | —CH₂CH₂CH₃ | 153–154 |

Table I-continued

The Examples of the Compounds Obtained by the Present Invention

Structure (A): pyrido-pyrimidine-2,4-dione with N1-R1 and N3-R2 substituents.

| Compound No. | R¹ | R² | Melting point(°C) |
|---|---|---|---|
| 89 | " | —CH(CH₃)₂ | 132–133 |
| 90 | " | —CH₂CH₂CH₂CH₃ | 143–144 |
| 91 | " | —CH₂CH=CH₂ | 186–187 |
| 92 | " | —CH₂C≡CH | 265–266 |
| 93 | " | —CH₂CH₂Cl | 169–170 |
| 94 | " | —CH₂CH₂OH | 213–214 |
| 95 | " | —CH₂CH₂CH₂OH | 177–178 |
| 96 | " | —CH₂CH₂OCOCH₃ | 173–174 |
| 97 | 2-F-C₆H₄ | —CH₂OCH₃ | 205–206 |
| 98 | " | —CH₂OC₂H₅ | 169–170 |
| 99 | " | —CH₂CH₂OC₂H₅ | 158–159 |
| 100 | " | —CH₂-C₆H₅ | 177–178 |
| 101 | " | —CH₂CH₂-N(piperazinyl)-C₆H₅ | 176–178 |
| 102 | " | —CH₂CH₂-N(piperazinyl)-CH₂-C₆H₅ | 153–155 |
| 103 | " | —CH₂CH₂CH₂N(CH₃)₂ | 136–138 |
| 104 | 2-Cl-C₆H₄ | —H | 292–294 |
| 105 | " | —C₂H₅ | 188–189 |
| 106 | " | —CH₂CH₂CH₃ | 195–196 |
| 107 | " | —CH₂CH₂CH₂CH₃ | 126–127 |
| 108 | " | —CH₂CH=CH₂ | 197–198 |
| 109 | " | —CH₂C≡CH | 226–227 |
| 110 | " | —CH₂CH₂Cl | 213–214 |
| 111 | " | —CH₂CH₂OH | 173–174 |
| 112 | " | —CH₂CH₂OCOCH₃ | 174–175 |
| 113 | 3-Cl-C₆H₄ | —H | 247–248 |
| 114 | " | —CH₃ | 239–240 |
| 115 | " | —C₂H₅ | 176–177 |
| 116 | " | —CH₂CH₂CH₃ | 152–153 |
| 117 | 4-Cl-C₆H₄ | —CH(CH₃)₂ | 171–172 |

Table I-continued

The Examples of the Compounds Obtained by the Present Invention

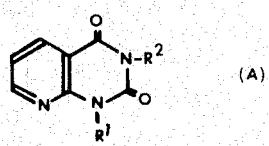
(A)

| Compound No. | R¹ | R² | Melting point(°C) |
|---|---|---|---|
| 118 | '' | —CH₂CH=CH₂ | 154–155 |
| 119 | '' | —CH₂C≡CH | 226–227 |
| 120 | '' | —CH₂CH₂Cl | 181–182 |
| 121 | '' | —CH₂CH₂OH | 176–177 |
| 122 | '' | —CH₂CH₂CH₂OH | 148–149 |
| 123 | '' | —CH₂CH₂OCOCH₃ | 177–179 |
| 124 | '' | —CH₂CH₂OC₂H₅ | 162–163 |
| 125 | '' | —CH₂COOC₂H₅ | 131–132 |
| 126 | '' | —CH₂CON⌒NCH₂CH₂OH | 104–105 |
| 127 | (2-Br-C₆H₄) | —H | 250–251 |
| 128 | '' | —CH₃ | 259–260 |
| 129 | '' | —C₂H₅ | 171–173 |
| 130 | '' | —CH₂CH₂CH₃ | 151–152 |
| 131 | '' | —CH₂CH=CH₂ | 141–142 |
| 132 | '' | —CH₂C≡CH | 185–186 |
| 133 | '' | —CH₂CH₂Cl | 168–170 |
| 134 | '' | —CH₂CH₂OH | 173–175 |
| 135 | '' | —CH₂CH₂CH₂OH | 153–154 |
| 136 | '' | —CH₂OCH₃ | 144–146 |
| 137 | (I-C₆H₄) | —H | 274–275 |
| 138 | '' | —CH₃ | 261–262 |
| 139 | '' | —CH₂CH₃ | 177–178 |
| 140 | '' | —CH(CH₃)₂ | 167–168 |
| 141 | '' | —CH₂CH₂Cl | 192–193 |
| 142 | '' | —CH₂CH=CH₂ | 161–162 |
| 143 | '' | —CH₂C≡CH | 183–184 |
| 144 | '' | —CH₂CH₂OH | 159–160 |
| 145 | '' | —CH₂CH₂CH₂OH | 154–155 |
| 146 | '' | —CH₂OCH₃ | 168–169 |
| 147 | (CH₃-C₆H₄) | —H | 274–275 |
| 148 | '' | —C₂H₅ | 178–180 |
| 149 | '' | —CH₂CH=CH₂ | 184–186 |
| 150 | '' | —CH₂CH₂OH | 154–155 |

Table I-continued

The Examples of the Compounds Obtained by the Present Invention

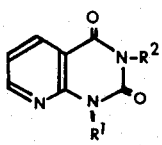
(A)

| Compound No. | R¹ | R² | Melting point(°C) |
|---|---|---|---|
| 151 | ⌬-CH₃ | —H | 260–261 |
| 152 | " | —CH₃ | 221–222 |
| 153 | " | —C₂H₅ | 182–183 |
| 154 | " | —CH₂CH₂CH₃ | 178–179 |
| 155 | " | —CH(CH₃)₂ | 168–169 |
| 156 | " | —CH₂CH₂CH₂CH₃ | 158–159 |
| 157 | ⌬-CH₃ | —CH₂CH=CH₂ | 162–164 |
| 158 | " | —CH₂C≡CH | 201–202 |
| 159 | " | —CH₂CH₂Cl | 183–184 |
| 160 | " | —CH₂CH₂OH | 205–206 |
| 161 | " | —CH₂CH₂OCOCH₃ | 194–195 |
| 162 | " | —CH₂OC₂H₅ | 154–155 |
| 163 | " | —CH₂CH₂OC₂H₅ | 142–143 |
| 164 | " | —CH₂COOC₂H₅ | 172–173 |
| 165 | ⌬-OC₂H₅ | —H | 290–291 |
| 166 | " | —CH₃ | 207–208 |
| 167 | " | —C₂H₅ | 194–196 |
| 168 | " | —CH₂CH=CH₂ | 160–161 |
| 169 | " | —CH₂CH₂OH | 171–172 |
| 170 | CH₃-⌬-CH₃ | —H | 298–299 |
| 171 | " | —C₂H₅ | 190–191 |
| 172 | " | —CH₂CH₂CH₃ | 166–167 |
| 173 | " | —CH(CH₃)₂ | 181–182 |
| 174 | " | —CH₂CH=CH₂ | 173–175 |
| 175 | " | —CH₂C≡CH | 235–236 |
| 176 | " | —CH₂CH₂Cl | 212–213 |
| 177 | CH₃-⌬-CH₃ | —CH₂CH₂OH | 193–195 |
| 178 | " | —CH₂CH₂OCOCH₃ | 209–210 |
| 179 | " | —CH₂CH₂OC₂H₅ | 167–168 |

Table I-continued

The Examples of the Compounds Obtained by the Present Invention

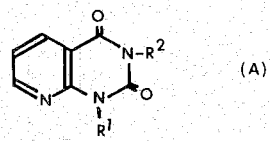 (A)

| Compound No. | R¹ | R² | Melting point(°C) |
|---|---|---|---|
| 180 | " | —CH₂COOC₂H₅ | 196–197 |
| 181 | 2-CH₃, 3-Cl-phenyl | —H | 303–305 |
| 182 | " | —CH₃ | 248–251 |
| 183 | " | —C₂H₅ | 198–200 |
| 184 | " | —CH₂CH₂CH₃ | 167–168 |
| 185 | " | —CH(CH₃)₂ | 174–176 |
| 186 | " | —CH₂CH₂CH₂CH₃ | 156–158 |
| 187 | " | —CH₂CH=CH₂ | 162–163 |
| 188 | " | —CH₂C(CH₃)=CH₂ | 164–166 |
| 189 | " | —CH₂CH=CHCl | 170–172 |
| 190 | " | —CH₂C≡CH | 177–178 |
| 191 | " | —CH₂CH₂Cl | 190–192 |
| 192 | " | —CH₂CH₂OH | 170–172 |
| 193 | " | —CH₂CH₂OCOCH₃ | 226–228 |
| 194 | " | —CH₂OCH₃ | 157–159 |
| 195 | " | —CH₂OC₂H₅ | 159–160 |
| 196 | " | —CH₂CH₂OC₂H₅ | 158–159 |
| 197 | 2-CH₃, 3-Cl-phenyl | —CH₂-phenyl | 130–132 |
| 198 | " | —CH₂-(4-Cl-phenyl) | 163–164 |
| 199 | " | —CH₂COCH₃ | 156–157 |
| 200 | " | —CH₂COOC₂H₅ | 198–199 |
| 201 | " | —CH₂CN | 276–277 |
| 202 | " | —CH₂CH₂-N(piperazinyl)-phenyl | 172–173 |
| 203 | " | —CH₂CH₂-N(piperazinyl)-N-CH₂-phenyl | 160–161 |
| 204 | 2,3-diCl-phenyl | —H | 278–279 |
| 205 | " | —C₂H₅ | 174–175 |
| 206 | " | —CH₂CH=CH₂ | 163–165 |
| 207 | " | —CH₂CH₂Cl | 193–195 |
| 208 | " | —CH₂CH₂OH | 193–194 |
| 209 | —CH₂-(4-Cl-phenyl) | —H | 235–236 |
| 210 | " | —CH₃ | 179–180 |

Table I-continued

The Examples of the Compounds Obtained by the Present Invention

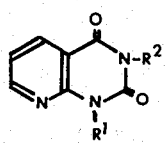 (A)

| Compound No. | R¹ | R² | Melting point(°C) |
|---|---|---|---|
| 211 | " | —$C_2H_5$ | 112–113 |
| 212 | " | —$CH_2CH_2OH$ | 122–123 |
| 213 | —$CH_2$—⟨phenyl⟩ | —H | 198–199 |
| 214 | " | —$CH_3$ | 149–150 |
| 215 | " | —$C_2H_5$ | 108–109 |
| 216 | " | —CH(CH₃)₂ | 95–96 |
| 217 | —$CH_2$—⟨phenyl⟩ | —$CH_2CH=CH_2$ | 107–108 |
| 218 | " | —$CH_2C≡CH$ | 148–149 |
| 219 | " | —$CH_2CH_2Cl$ | 119–120 |
| 220 | " | —$CH_2CH_2OH$ | 129–130 |
| 221 | ⟨cyclohexyl⟩ | —H | 223–224 |
| 222 | " | —$C_2H_5$ | 134–135 |
| 223 | " | —$CH_2CH_2CH_3$ | 131–132 |
| 224 | " | —CH(CH₃)₂ | 117–118 |
| 225 | " | —$CH_2CH_2CH_2CH_3$ | 121–122 |
| 226 | " | —$CH_2CH$(CH₃)₂ | 123–124 |
| 227 | " | —$CH_2CH=CH_2$ | 144–145 |
| 228 | " | —$CH_2C≡CH$ | 162–164 |
| 229 | " | —$CH_2CH_2Cl$ | 126–127 |
| 230 | " | —$CH_2CH_2OH$ | 122–123 |
| 231 | " | —$CH_2CH_2OCOCH_3$ | 128–130 |
| 232 | " | —$CH_2OC_2H_5$ | 128–129 |
| 233 | " | —$CH_2CH_2OC_2H_5$ | 82–83 |
| 234 | ⟨CF₃-phenyl⟩ | —$CH_2$—⟨cyclopropyl⟩ | 149–150 |
| 235 | " | —$CF_3$ | 208–209 |
| 236 | " | —$CH_2CH_2F$ | 164–165 |
| 237 | " | —$CH_2CF_3$ | 175–176 |
| 238 | " | —CH($C_2H_5$)$COOC_2H_5$ | oil |
| 239 | " | —$CH_2CH_2OCOOC_2H_5$ | 179–180 |
| 240 | ⟨phenyl⟩ | —CH(CH₃)₂ | 182–183 |

Table I-continued

The Examples of the Compounds Obtained by the Present Invention

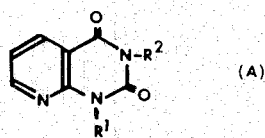

| Compound No. | R¹ | R² | Melting point(°C) |
|---|---|---|---|
| 241 | " | —CH$_2$—◁ | 213–214 |
| 242 | " | —CH$_2$CH$_2$F | 237–238 |
| 243 | " | —CH$_2$CF$_3$ | 189–190 |
| 244 | ⌬-F | —CH$_2$—◁ | 202–203 |
| 245 | " | —CH$_2$CH$_2$F | 201–202 |
| 246 | " | —CH$_2$CF$_3$ | 212–213 |
| 247 | " | —CH$_2$COOC$_2$H$_5$ | 174–175 |
| 248 | ⌬-F | —H | 305–306 |
| 249 | " | —CH$_3$ | 232–233 |
| 250 | " | —C$_2$H$_5$ | 184–185 |
| 251 | " | —CH$_2$CH$_2$CH$_3$ | 167–168 |
| 252 | " | —CH(CH$_3$)$_2$ | 190–192 |
| 253 | " | —CH$_2$—◁ | 184–186 |
| 254 | ⌬-F | —CH$_2$CH=CH$_2$ | 157–158 |
| 255 | " | —CH$_2$CH=C(CH$_3$)$_2$ | 178–180 |
| 256 | " | —CH$_2$C≡CH | 217–218 |
| 257 | " | —CH$_2$CH$_2$Cl | 184–185 |
| 258 | " | —CH$_2$CF$_3$ | 171–172 |
| 259 | " | —CH$_2$CH$_2$OH | 212–213 |
| 260 | " | —CH$_2$CH$_2$CH$_2$OH | 153–154 |
| 261 | " | —CH$_2$CH$_2$OC$_2$H$_5$ | 126–127 |
| 262 | " | —CH$_2$CH$_2$OCOCH$_3$ | 176–177 |
| 263 | ⌬-Cl | —CH$_2$CH(CH$_3$)$_2$ | 140–142 |
| 264 | " | —CH$_2$—◁ | 161–162 |
| 265 | " | —CH$_2$CH$_2$F | 186–187 |
| 266 | " | —CH$_2$CF$_3$ | 192–193 |
| 267 | " | —CH$_2$CH$_2$OCH$_2$CH$_2$OH | 152–153 |
| 268 | ⌬-Cl | —H | 288–289 |

Table I-continued

The Examples of the Compounds Obtained by the Present Invention

 (A)

| Compound No. | R¹ | R² | Melting point(°C) |
|---|---|---|---|
| 269 | " | —CH₃ | 229–230 |
| 270 | " | —C₂H₅ | 223–224 |
| 271 | " | —CH₂CH₂CH₃ | 175–176 |
| 272 | " | —CH₂—◁ | 194–195 |
| 273 | " | —CH₂CH=CH₂ | 177–178 |
| 274 |  | —CH₂C≡CH | 221–222 |
| 275 | " | —CH₂CH₂Cl | 209–211 |
| 276 | " | —CH₂CF₃ | 168–169 |
| 277 | " | —CH₂CH₂OH | 212–213 |
| 278 | " | —CH₂CH₂CH₂OH | 169–171 |
| 279 | " | —CH₂CH₂OCH₂CH₂OH | 139–141 |
| 280 | " | —CH₂COOC₂H₅ | 155–156 |
| 281 |  | —CH(CH₃)₂ | 180–181 |
| 282 | " | —CH₂CH₂CH₂CH₂CH₃ | 129–131 |
| 283 | " | —CH₂—◁ | 165–166 |
| 284 | " | —CH₂CH=C(CH₃)₂ | 190–191 |
| 285 | " | —CHF₂ | 198–200 |
| 286 | " | —CF₃ | 269–270 |
| 287 | " | —CH₂CH₂F | 182–183 |
| 288 | " | —CH₂CF₃ | 183–184 |
| 289 | " | —CH₂OC₂H₅ | 164–165 |
| 290 | " | —CH₂COOC₂H₅ | 157–158 |
| 291 |  | —H | 286–288 |
| 292 | " | —CH₃ | 233–234 |
| 293 | " | —C₂H₅ | 240–241 |
| 294 |  | —CH₂CH₂CH₃ | 178–180 |
| 295 | " | —CH₂—◁ | 198–199 |
| 296 | " | —CH₂CH=CH₂ | 180–181 |

Table I-continued

The Examples of the Compounds Obtained by the Present Invention

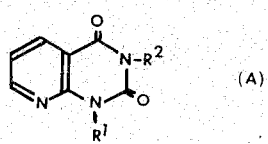

| Compound No. | R¹ | R² | Melting point(°C) |
|---|---|---|---|
| 297 | " | —CH$_2$CF$_3$ | 175–176 |
| 298 | " | —CH$_2$CH$_2$OH | 237–238 |
| 299 | " | —CH$_2$CH$_2$CH$_2$OH | 169–171 |
| 300 | (2-I-phenyl) | —CH$_2$CH$_2$CH$_3$ | 139–141 |
| 301 | " | —CH$_2$-cyclopropyl | 160–162 |
| 302 | " | —CH$_2$CH$_2$F | 194–195 |
| 303 | " | —CH$_2$CF$_3$ | 205–206 |
| 304 | (2-CH$_3$-phenyl) | —CH$_2$-cyclopropyl | 186–188 |
| 305 | " | —CH$_2$CF$_3$ | 171–172 |
| 306 | (2-OCH$_3$-phenyl) | —H | 304–305 |
| 307 | " | —C$_2$H$_5$ | 213–214 |
| 308 | " | —CH$_2$-cyclopropyl | 214–216 |
| 309 | (2,3-diCl-phenyl) | —CH$_3$ | 260–261 |
| 310 | " | —CH$_2$CH$_2$CH$_3$ | 169–170 |
| 311 | " | —CH$_2$-cyclopropyl | 165–167 |
| 312 | " | —CH$_2$C≡CH | 238–239 |
| 313 | " | —CH$_2$CH$_2$F | 191–192 |
| 314 | (2,6-diCl-phenyl) | —CH$_2$CF$_3$ | 158–159 |
| 315 | " | —CH$_2$CH$_2$CH$_2$OH | 166–167 |
| 316 | " | —CH$_2$OCH$_3$ | 149–150 |
| 317 | " | —CH$_2$CH$_2$OCH$_2$CH$_2$OH | 149–150 |
| 318 | " | —CH$_2$CH$_2$OCOCH$_3$ | 138–140 |
| 319 | " | —CH$_2$COOC$_2$H$_5$ | 172–173 |
| 320 | (2-CH$_3$-6-Cl-phenyl) | —CH$_2$CON(morpholino)NCH$_2$CH$_2$OH | 188–190 |

TEST SERIES

With respect to numerous compounds of the present invention, the acute toxicity was tested to ensure their safety, and further the central nervous depressive, anti-inflammatory and analgetic effects were tested to prove their excellent activities. The results of each test are indicated in Table II. Each test was conducted in the following manner.

1. Acute toxicity

Each test compound suspended in 0.5 % CMC-physiological saline solution was injected intraperitoneally to dd-strain male mice (16–24 g). The lethal dose was estimated from the death of animals 24 hours after administration.

2. Central nervous system depressive effect

Each test compound suspended in 0.5 % CMC-physiological saline solution was injected intraperitoneally to dd-strain male mice (16–24 g). The disappearance of righting reflex was observed under noiseless circumstances.

The dose required for the disappearance of righting reflex was indicated with notations as follows:

more than 1,000 (mg/kg) : —  100–30 (mg/kg) : ++
1000–300 (mg/kg) : ±  less than 30 (mg/kg) : +++
300–100 (mg/kg) : +

3. Anti-inflammatory effect

A group of five Wistar-strain male rats (100–150 g) were orally administered with each test compound suspended in 0.5 % CMC-physiologoical saline solution. After 30 minutes, 0.5 %–1.0 % carrageenin suspended in the water for injection was injected subcutaneously to a hind paw. After 3 hours the carrageenin edema was measured by volume and the inhibition percentage was determined with respect to the results for the control animals. The inhibition percentages were shown with the notations as follows:

less than 15 % : ±  31–45 % : ++
16–30 % : +  more than 46 % : +++

4. Analgetic Effect

Each test compound suspended in 0.5 % CMC-physiological saline solution was orally administered to dd-strain male mice (18–20 g). After one hour 0.6 % acetic acid solution was intraperitoneally injected at the rate of 0.1 ml/10 g. The writhing syndrome was observed for 10 minutes from 30 minutes after administration, and the inhibition percentage comparing with the control animal was determined.

The inhibition percentages are shown with the notations as follows:

less than 25 % : ±  51–75 % : ++
26–50 % : +  more than 76 % : +++

Table II

Anti-inflammatory, Analgetic and Central Nervous System Depressive Effects, and Acute Toxicity of the Object Compounds of General Formula [A]

| | | anti-inflammatory effect dose(mg/kg) | | | analgetic effect (100mg/kg) | C N S depressive effect | acute toxicity (mg/kg) |
|---|---|---|---|---|---|---|---|
| Standard | | 100 | 50 | 20 | | | |
| phenylbutazone | | ++ | ++ | + | ± | ± | 300–1000 |
| flufenamic acid | | ++ | + | ± | + | — | 300–1000 |
| aminopyrine | | + | ± | ± | ++ | / | 100–300 |
| methaqualone | | / | / | / | + | +++ | 300–1000 |
| diazepam | | ++ | + | + | + | ++ | 300–1000 |

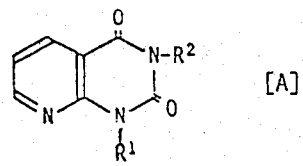  [A]

| | | anti-inflammatory effect dose(mg/kg) | | | analgetic effect (100mg/kg) | C N S depressive effect | acute toxicity (mg/kg) |
|---|---|---|---|---|---|---|---|
| R¹ | R² | 100 | 50 | 20 | | | |
| ⌬-CF₃ | —H | + | ± | / | ± | — | >1000 |
| " | —CH₃ | ++ | + | + | +++ | ± | >1000 |
| " | —C₂H₅ | +++ | +++ | +++ | +++ | +++ | >1000 |
| " | —CH₂CH₂CH₃ | ++ | + | + | ++ | — | >1000 |
| " | —CH(CH₃)₂ | +++ | ++ | ++ | + | ± | >1000 |
| ⌬-CF₃ | —CH₂CH₂CH₂CH₃ | ± | / | / | + | — | >1000 |
| " | —CH₂CH=CH₂ | +++ | +++ | ++ | ++ | ++ | >1000 |
| " | —CH₂C(CH₃)=CH₂ | ++ | / | / | ++ | — | >1000 |
| " | —CH₂CH=CHCl | ++ | + | + | +++ | — | >1000 |
| " | —CH₂C≡CH | +++ | ++ | + | ± | ++ | >1000 |

Table II-continued

Anti-inflammatory, Analgetic and Central Nervous System Depressive Effects, and Acute Toxicity of the Object Compounds of General Formula [A]

| Standard | | anti-inflammatory effect dose(mg/kg) | | | analgetic effect (100mg/kg) | C N S depressive effect | acute toxicity (mg/kg) |
|---|---|---|---|---|---|---|---|
| | | 100 | 50 | 20 | | | |
| '' | —CH₂CH₂Cl | +++ | +++ | +++ | ++ | — | >1000 |
| '' | —CH₂CH₂Br | +++ | +++ | + | ++ | — | >1000 |
| '' | —CH₂CH₂CH₂Cl | ± | / | / | ++ | — | >1000 |
| '' | —CH₂CH₂OH | +++ | +++ | ++ | +++ | +++ | 300–1000 |
| '' | —CH₂CH₂CH₂OH | +++ | +++ | +++ | ++ | ++ | 300–1000 |
| '' | —CH₂CH—CH₃ <br>        OH | +++ | +++ | ++ | ++ | ++ | >1000 |
| '' | —CH₂CH—CH₂OH <br>        OH | +++ | ++ | / | +++ | + | >1000 |
| '' | —CH₂CH—CH₂Cl <br>        OH | / | / | / | + | ± | >1000 |
| '' | —CH₂CH₂OCOCH₃ | +++ | +++ | ++ | ++ | + | >1000 |
| '' | —CH₂OCH₃ | ++ | + | ± | ++ | ++ | 300–1000 |
| '' | —CH₂OC₂H₅ | + | + | ± | + | ++ | >1000 |
| '' | —CH₂CH₂OC₂H₅ | +++ | ++ | ++ | + | + | >1000 |
|  | —CH₂CH₂OCH=CH₂ | ++ | ++ | / | ± | — | >1000 |
| '' | —CH₂CH₂OCH₂CH₂OH | +++ | +++ | ++ | +++ | ++ | 300–1000 |
| '' | —CH₂CHOC₂H₅ <br>     Cl | + | / | / | ++ | — | >1000 |
| '' | —CH₂—CH—CH₂ <br>       \\O/ | ++ | ++ | ++ | + | — | >1000 |
| '' | -CH₂- | +++ | ++ | + | ± | — | >1000 |
| '' | -CH₂CH₂- | ± | / | / | + | — | >1000 |
| '' | -CH₂-CH- <br>     OH | ± | / | / | / | — | >1000 |
| '' | —CH₂COCH₃ | ± | / | / | ± | — | >1000 |
| '' | -CH₂CO--Cl | ± | / | / | ++ | — | >1000 |
| '' | -CH₂CO- | ++ | + | + | / | — | >1000 |
| '' | —CH₂COOH | ± | / | / | ± | — | >1000 |
| '' | —CH₂COOC₂H₅ | ± | / | / | + | — | >1000 |
| '' | —CH₂CH₂N(C₂H₅)₂ | ++ | ± | / | + | + | 100–300 |
| '' | -CH₂CH₂-N | ++ | + | / | ++ | + | 100–300 |
| '' | -CH₂CH₂-N | + | + | / | / | ± | 300–1000 |

Table II-continued

Anti-inflammatory, Analgetic and Central Nervous System Depressive Effects, and Acute Toxicity of the Object Compounds of General Formula [A]

| | Standard | anti-inflammatory effect dose(mg/kg) 100 | 50 | 20 | analgetic effect (100mg/kg) | C N S depressive effect | acute toxicity (mg/kg) |
|---|---|---|---|---|---|---|---|
| '' | -CH$_2$CH$_2$-N◯N-CH$_3$ | ++ | + | + | / | ± | 300–1000 |
| '' | -CH$_2$CH$_2$-N◯N-CH$_2$-◯ | ++ | ++ | / | / | – | >1000 |
| 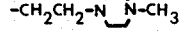CF$_3$ | -CH$_2$CH$_2$-N◯N-CH$_2$-◯ | ++ | ± | / | + | – | >1000 |
| '' | -CH$_2$CH$_2$CH$_2$N(CH$_3$)$_2$ | +++ | ++ | ++ | / | + | 100–300 |
| '' | -CH$_2$CHCH$_2$-N◯ (OH) | ++ | ++ | ± | ± | – | 100–300 |
| '' | —CH$_2$CH$_2$NHCONH$_2$ | + | ± | / | + | – | >1000 |
| '' | -CH$_2$CH$_2$-N◯N-CH$_2$CH$_2$OH | ± | / | / | + | – | 300–1000 |
| '' | -CH$_2$CO-N◯N-CH$_2$CH$_2$OH | ++ | + | + | / | – | >1000 |
| -CF$_3$ | —C$_2$H$_5$ | + | / | / | + | – | >1000 |
| '' | —CH$_2$CH$_2$OH | + | / | / | + | – | >1000 |
| CF$_3$/CF$_3$ | —C$_2$H$_5$ | ± | / | / | ± | – | >1000 |
| '' | —CH$_2$CH$_2$OH | + | / | / | ± | – | >1000 |
| 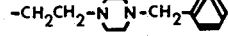 | —C$_2$H$_5$ | +++ | +++ | +++ | +++ | ++ | >1000 |
| '' | —CH$_2$CH$_2$CH$_3$ | +++ | +++ | +++ | + | ± | 300–1000 |
| '' | —CH$_2$CH=CH$_2$ | +++ | +++ | +++ | + | – | >1000 |
| '' | —CH$_2$C≡CH | +++ | +++ | +++ | ++ | ± | 300–1000 |
| '' | —CH$_2$CH$_2$Cl | +++ | +++ | +++ | + | ± | >1000 |
| '' | —CH$_2$CH$_2$OH | + | ± | / | +++ | – | >1000 |
| '' | —CH$_2$CH$_2$CH$_2$OH | +++ | / | / | ++ | ± | 300–1000 |
| 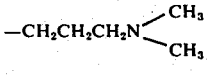F | —CH$_3$ | / | / | / | ++ | – | >1000 |
| '' | —C$_2$H$_5$ | ++ | ± | / | + | + | >1000 |
| '' | —CH$_2$CH=CH$_2$ | / | / | / | ++ | – | >1000 |
| '' | —CH$_2$CH$_2$OH | ± | / | / | ++ | + | 100–300 |
| 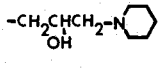F | —C$_2$H$_5$ | +++ | +++ | +++ | +++ | ++ | 300–1000 |
| '' | —CH$_2$CH=CH$_2$ | +++ | +++ | +++ | + | – | >1000 |
| '' | —CH$_2$C≡CH | ++ | / | / | + | – | >1000 |
| '' | —CH$_2$CH$_2$Cl | ++ | / | / | + | ± | >1000 |
| '' | —CH$_2$CH$_2$OH | + | + | ± | +++ | ± | >1000 |
| '' | —CH$_2$CH$_2$CH$_2$OH | +++ | +++ | ++ | ++ | ± | 300–1000 |
| Cl | —C$_2$H$_5$ | / | / | / | + | – | >1000 |
| '' | —CH$_2$CH$_2$OH | / | / | / | + | ++ | 300–1000 |
| Cl | —CH$_3$ | +++ | +++ | +++ | +++ | ± | >1000 |

Table II-continued

Anti-inflammatory, Analgetic and Central Nervous System Depressive Effects, and Acute Toxicity of the Object Compounds of General Formula [A]

| Standard | | anti-inflammatory effect dose(mg/kg) | | | analgetic effect (100mg/kg) | C N S depressive effect | acute toxicity (mg/kg) |
|---|---|---|---|---|---|---|---|
| | | 100 | 50 | 20 | | | |
| '' | —C$_2$H$_5$ | +++ | +++ | +++ | ++ | + | >1000 |
| '' | —CH$_2$CH$_2$CH$_3$ | +++ | +++ | +++ | +++ | + | 300–1000 |
| '' | —CH(CH$_3$)$_2$ | +++ | +++ | +++ | ++ | ++ | >1000 |
| '' | —CH$_2$CH=CH$_2$ | +++ | +++ | ++ | ++ | + | >1000 |
|  (2-Cl-phenyl) | —CH$_2$C≡CH | +++ | +++ | +++ | ++ | − | >1000 |
| '' | —CH$_2$CH$_2$Cl | +++ | +++ | +++ | ++ | + | 300–1000 |
| '' | —CH$_2$CH$_2$OH | + | + | ± | ++ | − | >1000 |
| '' | —CH$_2$CH$_2$CH$_2$OH | +++ | +++ | +++ | ++ | ± | 300–1000 |
| '' | —CH$_2$CH$_2$OC$_2$H$_5$ | ++ | ++ | + | ++ | + | >1000 |
|  (2-Br-phenyl) | —C$_2$H$_5$ | +++ | +++ | ++ | +++ | ++ | >1000 |
| '' | —CH$_2$CH$_2$CH$_3$ | +++ | +++ | +++ | ++ | ± | >1000 |
| '' | —CH$_2$CH=CH$_2$ | +++ | +++ | ++ | ++ | − | >1000 |
| '' | —CH$_2$C≡CH | +++ | +++ | +++ | +++ | − | >1000 |
| '' | —CH$_2$CH$_2$Cl | +++ | +++ | +++ | +++ | − | >1000 |
| '' | —CH$_2$CH$_2$OH | +++ | +++ | +++ | +++ | ++ | >1000 |
| '' | —CH$_2$CH$_2$CH$_2$OH | +++ | +++ | +++ | ++ | ± | 300–1000 |
| '' | —CH$_2$OCH$_3$ | +++ | +++ | ++ | +++ | − | >1000 |
|  (2-I-phenyl) | —CH$_2$CH$_3$ | +++ | +++ | +++ | +++ | + | >1000 |
| '' | —CH$_2$CH$_2$Cl | / | / | / | ± | ± | >1000 |
| '' | —CH$_2$CH$_2$CH$_2$OH | / | / | / | ++ | − | >1000 |
| '' | —CH$_2$CH=CH$_2$ | / | / | / | +++ | ± | >1000 |
|  (2-CH$_3$-phenyl) | —CH$_2$CH=CH$_2$ | +++ | +++ | +++ | + | + | >1000 |
| '' | —CH$_2$C≡CH | +++ | +++ | +++ | ++ | − | >1000 |
| '' | —CH$_2$CH$_2$Cl | +++ | ++ | / | − | − | >1000 |
| '' | —CH$_2$CH$_2$OH | + | / | / | + | ± | >1000 |
|  (2,3-diMe-phenyl) | —C$_2$H$_5$ | ± | / | / | + | − | >1000 |
| '' | —CH$_2$CH=CH$_2$ | / | / | / | ± | − | >1000 |
| '' | —CH$_2$C≡CH | / | / | / | ± | − | >1000 |
| '' | —CH$_2$CH$_2$Cl | / | / | / | + | − | >1000 |
| '' | —CH$_2$CH$_2$OH | ± | / | / | + | ± | >1000 |
|  (3-Me-2-Cl-phenyl) | —C$_2$H$_5$ | ++ | + | + | + | − | >1000 |
|  (2,3-diCl-phenyl) | —C$_2$H$_5$ | +++ | +++ | +++ | ++ | − | >1000 |
| '' | —CH$_2$CH=CH$_2$ | ± | / | / | ++ | − | >1000 |
| '' | —CH$_2$CH$_2$Cl | +++ | ++ | ± | ++ | − | >1000 |
| '' | —CH$_2$CH$_2$OH | ± | / | / | +++ | ± | 300–1000 |
|  (4-Cl-benzyl) | —C$_2$H$_5$ | + | + | ± | − | − | >1000 |
| '' | —CH$_2$CH$_2$OH | ++ | + | ± | − | − | >1000 |
|  (benzyl) | —C$_2$H$_5$ | / | / | / | ++ | − | >1000 |
|  (2-CF$_3$-phenyl) | —CH$_2$-cyclopropyl | ++ | +++ | +++ | +++ | ++ | 100–300 |
| '' | —CH$_2$CF$_3$ | +++ | ++ | + | ++ | ++ | 300–1000 |
|  (phenyl) | —CH$_2$-cyclopropyl | +++ | ++ | +++ | +++ | +++ | 100–300 |

Table II-continued

Anti-inflammatory, Analgetic and Central Nervous System Depressive Effects, and Acute Toxicity of the Object Compounds of General Formula [A]

| Standard | | anti-inflammatory effect dose(mg/kg) | | | analgetic effect (100mg/kg) | C N S depressive effect | acute toxicity (mg/kg) |
|---|---|---|---|---|---|---|---|
| | | 100 | 50 | 20 | | | |
| '' | —CH$_2$CF$_3$ | + | + | / | ++ | +++ | 100–300 |
| (2-F-phenyl) | —CH$_2$—◁ | +++ | +++ | +++ | +++ | + | 300 |
| '' | —CH$_2$CF$_3$ | ++ | ++ | ++ | +++ | ± | >1000 |
| (4-F-phenyl) | —C$_2$H$_5$ | +++ | +++ | +++ | +++ | +++ | 100–300 |
| '' | —CH$_2$—◁ | +++ | +++ | +++ | +++ | +++ | 100 |
| '' | —CH$_2$CF$_3$ | +++ | +++ | +++ | +++ | +++ | 100–300 |
| (2-Cl-phenyl) | —CH$_2$—◁ | +++ | +++ | +++ | +++ | ++ | 100–300 |
| '' | —CH$_2$CF$_3$ | +++ | ++ | +++ | ++ | ++ | >1000 |
| '' | —CH$_2$CH$_2$OCH$_2$CH$_2$OH | +++ | +++ | +++ | ++ | +++ | / |
| (4-Cl-phenyl) | —C$_2$H$_5$ | +++ | +++ | +++ | ++ | + | 300–1000 |
| '' | —CH$_2$—◁ | +++ | +++ | +++ | ++ | + | 100–300 |
| '' | —CH$_2$CF$_3$ | ++ | ++ | ++ | ++ | ++ | 300–1000 |
| '' | —CH$_2$CH$_2$Cl | +++ | ++ | ++ | ± | – | / |
| '' | —CH$_2$CH$_2$OH | ± | ± | / | ++ | ++ | / |
| (2-Br-phenyl) | —CH$_3$ | +++ | +++ | +++ | +++ | ++ | >1000 |
| '' | —CH(CH$_3$)$_2$ | +++ | +++ | ++ | +++ | ++ | 300–1000 |
| '' | —CH$_2$—◁ | +++ | +++ | +++ | +++ | ++ | 100–300 |
| '' | —CH$_2$CH=C(CH$_3$)$_2$ | +++ | +++ | + | +++ | – | >1000 |
| '' | —CH$_2$CF$_3$ | +++ | +++ | +++ | +++ | ++ | 300–1000 |
| (4-Br-phenyl) | —C$_2$H$_5$ | +++ | +++ | +++ | +++ | + | 300–1000 |
| '' | —CH$_2$—◁ | ++ | ++ | ++ | + | – | 300–1000 |
| '' | —CH$_2$CF$_3$ | + | + | + | ++ | ± | 300–1000 |
| (2-I-phenyl) | —CH$_3$ | +++ | ++ | ++ | +++ | ± | >1000 |
| '' | —CH$_2$—◁ | +++ | +++ | +++ | +++ | + | 300–1000 |
| '' | —CH$_2$C≡CH | +++ | +++ | ++ | +++ | +++ | <500 |
| '' | —CH$_2$CF$_3$ | +++ | ++ | ++ | +++ | + | 1000 |
| (2-CH$_3$-phenyl) | —CH$_2$—◁ | +++ | +++ | +++ | +++ | ± | >1000 |
| '' | —CH$_2$CF$_3$ | ++ | ++ | ± | ++ | ++ | 1000 |
| (2,6-Cl$_2$-phenyl) | —CH$_3$ | +++ | ++ | +++ | ++ | ± | 300–1000 |
| '' | —CH$_2$—◁ | +++ | +++ | ++ | +++ | + | 300–1000 |
| '' | —CH$_2$CF$_3$ | +++ | ++ | +++ | ++ | ++ | 1000 |

EXAMPLE 1

To a mixture of 3.1 g of 1-(m-trifluoromethylphenyl)pyrido[2,3-d]-pyrimidine-2,4(1H,3H)-dione and 40 ml of dried dimethylformamide was added 0.7 g of 50 % sodium hydride and the mixture was stirred for one hour at room temperature. Then, 0.6 g of methyl iodide was further added and the mixture was reacted for one hour at room temperature. The solvent was then distilled off under reduced pressure, and to the residue was added water. The crystals produced were recrystallized from methanol, 2.7 g of colorless prisms of 1-(m-trifluoromethylphenyl)-3-methylpyrido[2,3-d]pyrimidine-2,4 (1H,3H)-dione was obtained.

Melting point 221.5°–222°C.

Ultimate analysis value $C_{15}H_{10}F_3N_3O_2$; theoretical values C:56.08, H:3.14, N:13.08; found values C:55.93, H:2.92, N:13.02.

EXAMPLE 2

Sodium ethoxide was prepared from 0.6 g of metallic sodium and 15 ml of ethyl alcohol. To this was added the solution obtained by dissolving 6.2 g of 1-(m-trifluoromethylphenyl)pyrido[2,3-d]pyrimidine-2,4(1H,3H)-dione in 20 cc of dried dimethylformamide. Then 5.5 g of ethyl iodide was added and the mixture was stirred for 1.5 hours at room temperature. Water was further added, the crystals produced were filtered and dried, and upon recrystallization from methanol, 5.3 g of colorless prisms of 1-(m-trifluoromethylphenyl)-3-ethylpyrido[2,3-d]pyrimidine-2,4(1H,3H)-dione was obtained.

Melting point 160°–161°C.

Ultimate analysis value $C_{16}H_{12}F_3N_3O_2$; theoretical values C:57.31, H:3.61, N:12.53; found values C:57.64, H:3.65, N:12.30

EXAMPLE 3

To a mixture of 2.7 g of 1-(m-chlorophenyl)-pyrido[2,3-d]pyrimidine-2,4(1H,3H)-dione and 40 ml of dried dimethylformamide was added 0.6 g of 50 % sodium hydride and the mixture was stirred for one hour. Then, 3.3 g of 2-bromoethylacetate was further added and the mixture was reacted for 2 hours at room temperature. The solvent was then distilled off under reduced pressure, to the residue was added water, the crystals produced were filtered and dried, and upon recrystallization from methanol, 2.6 g of colorless prisms of 1-(m-chlorophenyl)-3-(2-acetoxyethyl)pyrido[2,3-d] pyrimidine-2,4(1H,3H)-dione was obtained.

Melting point 177°–179°C.

Ultimate analysis value $C_{17}H_{14}ClN_3O_4$; theoretical values C:56.75, H:3.92, N:11.68; found values C:56.92, H:3.90, N:11.73.

EXAMPLE 4

To a solution of 2.9 g of 1-(2-methyl-3-chlorophenyl)pyrido[2,3-d] pyrimidine-2,4(1H,3H)-dione and 20 ml of dried dimethylformamide was added 0.53 g of 50 % sodium hydride; the mixture was stirred for 30 minutes, 2.1g of n-butyl iodide was further added and the mixture was reacted for one hour at room temperature. The solvent was then distilled off under reduced pressure. To the residue was added water and the crystals produced were filtered. Upon recrystallization from ethylether and petroleum benzine, 2.8 g of colorless prisms of 1-(2-methyl-3-chlorophenyl)-3-n-butylpyrido[2,3-d]pyrimidine-2,4(1H,3H)-dione was obtained.

Melting point 156°–158°C.

Ultimate analysis value $C_{18}H_{18}ClO_2N_3$; theoretical values C:62.88, H:5.28, N:12.22; found values C:62.76, H:5.15, N:12.13.

EXAMPLE 5

To a solution of 2.5 g of 1-(o-tolyl)pyrido[2,3-d]pyrimidine-2,4 (1H,3H)-dione and 40 ml of dried dimethylformamide was added 0.7 g of 50 % sodium hydride; the mixture was stirred for one hour. Then 2.4 g of allyl iodide was further added and the mixture was reacted for 30 minutes at room temperature. Then the solvent was distilled off under reduced pressure. To the residue was added water and the crystals produced were filtered. Upon recrystallization from methanol, 2.4 g of colorless prisms of 1-(o-tolyl)-3-allyl-pyrido[2,3-d]pyrimidine-2,4(1H,3H)-dione was obtained.

Melting point 185°–186°C.

Ultimate analysis value $C_{17}H_{15}N_3O_2$;
Theoretical values C:69.61, H:5.15, N:14.33;
Found values C:69.53, H:5.28, N:14.21.

EXAMPLE 6

To a solution of 2.8 g of 1-(p-ethoxyphenyl)-pyrido[2,3-d]pyrimidine-2,4(1H,3H)-dione and 40 ml of dried dimethylformamide was added 0.53 g of 50 % sodium hydride; the mixture was stirred for one hour, and 2.5 g of ethylenebromohydrine was further added and the mixture was reacted for 30 minutes at room temperature. The solvent was then distilled under reduced pressure. To the residue was added water and the crystals produced were filtered. Upon recrystallization from methanol, 3.1 g of colorless needles of 1-(p-ethoxyphenyl)-3-(2-hydroxyethyl)pyrido[2,3-d]pyrimidine-2,4(1H,3H)-dione was obtained.

Melting point 171°–172°C.

Ultimate analysis value $C_{17}H_{17}N_3O_4$;
Theoretical values C:62.37, H:5.24, N:12.84;
Found values C:62.34, H:5.15, N:12.91.

EXAMPLE 7

To a solution of 2.6 g of 1-(m-fluorophenyl)-pyrido[2,3-d]pyrimidine2,4(1,3H)-dione and 30 ml dried dimethylformamide was added 0.6 g of 50 % sodium hydride; the mixture was stirred for 30 minutes. Then 1.9 g of methyl iodide was added and the mixture was reacted for one hour at room temperature. The solvent was then distilled off under reduced pressure, and to the residue was added water, and the mixture was extracted with ether. Evaporation of the solvent gave 2.5 g of colorless prisms of 1-(m-fluorophenyl)-3-methyl-pyrido[2,3-d]pyrimidine-2,4(1H,3H)-dione.

Melting point 197°–198°C.

Ultimate analysis value $C_{14}H_{10}FN_3O_2$;
Theoretical values C:61.99, H;3.72, N:15.49;
Found values C:61.83, H:3.81, N:15.38.

Example 8

To a solution of 15 ml of ethyl alcohol and 0.28 g of metallic sodium was added a solution of 3.1 g of 1-(o-fluorophenyl)pyrido[2,3-d]pyrimidine-2,4(1H,3H)-dione in 15 ml of dimethylformamide. The mixture was stirred for 30 minutes. Then 2.2 g of ethylbromide was added to the mixture, and the whole was stirred for 2 hours at room temperature. To the reaction mixture was added water, and crystals produced were recrystallized from methanol to give 2.9 g of colorless prisms of 1-(o-fluorophenyl)-3-ethylpyrido[2,3-d]pyrimidine-2,4(1H,3H)-dione.

Melting point 180°–181°C.
Ultimate analysis value $C_{15}H_{12}FN_3O_2$;
Theoretical values C:63,15, H:4.25, N:14.73;
Found values C:63.23, H:4.18, N:14.62.

EXAMPLE 9

To a solution of 2.4 g of 1-phenylpyrido[2,3-d]pyrimidine-2,4(1H,3H)-dione and 30 ml of dimethylformamide was added 0.5 g of sodium amide, and the whole was stirred for one hour. To the mixture was added 1.6 g of chlorodimethylether and allowed to stand for 2 hours. Then the solvent was evaporated under reduced pressure, and to the residue was added water. The crystals produced were recrystallized from methanol to give 2.0 g of colorless prisms of 1-phenyl-3-methoxymethylpyrido[2,3-d]pyrimidine-2,4 (1,3H)-dione.

Melting point 150°–152°C.
Ultimate analysis value $C_{15}H_{13}N_3O_3$;
Theoretical values C:63.59, H:4.63, N:14.83;
Found values C:63.48, H:4.72, N:14.78.

EXAMPLE 10

To a solution of 0.95 g of 1-(p-trifluoromethylphenyl)pyrido[2,3-d] pyrimidine-2,4(1H,3H)-dione and 25 ml dried dimethylformamide was added 0.17 g of 50 % sodium hydride; the mixture was stirred for 30 minutes. Then 1.3 g of 0-(p-tosyl)ethyleneglycol was further added, and the mixture was stirred for one hour at room temperature, then reacted for 30 minutes at 60°C. The solvent was then distilled off under reduced pressure and to the residue was added water, and upon recrystallization from methanol, 0.85 g of colorless prisms of 1-(p-trifluoromethylphenyl)-3-(2-hydroxyethyl)pyrido[2,3-d]pyrimidine-2,4(1H,3H)-dione was obtained.

Melting point 209°–211°C
Ultimate analysis value $C_{16}H_{12}F_3N_3O_3$.
Theoretical values C:54.70, H:3.44, N:11.96;
Found values C:54.52, H:3.28, N:12.10.

EXAMPLE 11

To a solution of 2.7 g of 1-(m-chlorophenyl)-pyrido[2,3-d]pyrimidine -2,4(1H,3H)-dione and 30 ml of dried xylene was added 0.58 g of sodium amide; the mixture was stirred for one hour. To the solution was added 3.7 g of benzenesulfonyl ethyl ester, and the whole was reacted for 2 hours at 80°C. The solvent was then distilled off under reduced pressure. Upon recrystallization from methanol, 2.6 g 1-(m-chlorophenyl)-3-ethylpyrido [2,3-d]pyrimidine-2,4(1H,3H)-dione was obtained.

Melting point 176°–177°C.
Ultimate analysis value $C_{15}H_{12}ClN_3O_2$; theoretical values C:59.71, H:4.01, N:13.93; found values C:59.74, H:3.91, N:13.99.

EXAMPLE 12

To a solution of 3.1 g of 1-(m-trifluoromethylphenyl)pyrido[2,3-d] pyrimidine-2,4(1H,3H)-dione and 20 ml of dimethylformamide was added 0.58 g of 50% sodium hydride; the mixture was stirred for 30 minutes at room temperature. Then 1.8 g of 3-chloro-2-methyl-1-propene was further added and the mixture was reacted for one hour at room temperature. The solvent was then distilled off under reduced pressure. To the residue was added water and the crystals produced were filtered. Upon recrystallization from methanol, 2.9 g of colorless plates of 1-(m-trifluoromethylphenyl)-3-(2-methylallyl)pyrido[2,3-d]pyrimidine-2,4(1H,3H)-dione was obtained.

Melting point 130°–131°C
Ultimate analysis value $C_{18}H_{14}F_3N_3O_2$; theoretical values C:59.83, H:3.91, N:11.63; found values C:59.79, H:3.87, N:11.69.

EXAMPLE 13

To a solution of 1-(p-trifluoromethylphenyl)-pyrido[2,3-d]pyrimidine2,4(1H,3H)-dione and 20 ml of dimethylformamide was added 0.58 g of 50 % sodium hydride; the mixture was stirred for 30 minutes. Then 3.1 g of ethyliodide was further added and the mixture was stirred for one hour at room temperature. The solvent was then distilled off under reduced pressure. To the residue was added water, and the crystals produced were filtered. Upon recrystallization from methanol, 3.0 g of colorless prisms of 1-(p-trifluoromethylphenyl)-3-ethylpyrido[2,3-d]pyrimidine-2,4(1H,3H)-dione was obtained.

Melting point 214°–215°C.
Ultimate analysis value $C_{16}H_{12}F_3N_3O_2$; theoretical values C:57.31, H:3.61, N:12.52; found values C:57.58, H:3.71, N:12.61.

EXAMPLE 14

To a solution of 3.1 g of 1-(m-trifluoromethylphenyl)pyrido[2,3-d]-pyrimidine-2,4(1,3H)-dione and 25 ml of dimethylformamide was added 0.72 g of sodium hydride and the mixture was stirred for 30 minutes, then 5.1 g of ethyl 0-(p-tosyl)glycolate was further added and the whole was reacted for one hour at 80°C. The solvent was then distilled off under reduced pressure, and upon recrystallization of the residue from methanol, 2,8 g of colorless prisms of 1-(m-trifluoromethylphenyl)-3-ethoxycarbonylmethyl-pyrido[2,3-d]pyrimidine-2,4(1H,3H)-dione was obtained.

Melting point 153°–154°C
Ultimate analysis value $C_{18}H_{14}F_3N_3O_4$; theoretical values C:54.94, H:3.59, N:10.68; found values C:54.82, H:3.47, N:10.52 .

EXAMPLE 15

To a solution of 0.2 g of 1-(m-trifluoromethylphenyl)pyrido[2,3-d] pyrimidine-2,4(1H,3H)-dione and 15 ml of dried dimethylformamide was added 0.05 g of 50 % sodium hydride, the mixture was stirred for one hour at room temperature. To the mixture was added the solution obtained by dissolving 0.24 g of chloroacetoamide in 5 ml of dried dimethylformamide. And the mixture was stirred for 2 hours at room temperature. The solvent was then distilled off under reduced pressure, to the residue was added water, the crystals produced were filtered and dried. Upon recrystallization from methanol, 0.18 g of colorless prisms of 1-(m-trifluoromethylphenyl)-3-carbamoylmethyl-pyrido[2,3-d]pyrimidine-2,4(1H,3H)-dione was obtained.

Melting point 254°–256°C.
Ultimate analysis value $C_{16}H_{11}F_3N_4O_3$; theoretical values $C:_{52.77}$, H:3.04, N:15.38; found values C:52.85, H:3.19, N:15.54.

EXAMPLE 16

To a solution of 3.1 g of 1-(m-trifluoromethylphenyl)pyrido[2,3-d] pyrimidine-2,4(1H,3H)-dione and 30 ml of dried dimethylformamide was added 0.72 g of 50 % sodium hydride; the mixture was stirred for one hour. Then 2.5 g of ethyl chloroacetate was further added and the mixture was reacted for one hour at room temperature. The solvent was then distilled off under reduced pressure, to the residue was added water and the crystals produced were recrystallized from methanol, 3.2 g of colorless prisms of 1-(m-trifluoromethylphenyl)-3-ethoxycarbonylmethyl-pyrido[2,3-d]pyrimidine-2,4(1H, 3H)-dione was obtained.

Melting point 153°–154°C.

Ultimate analysis value $C_{18}H_{14}F_3N_3O_4$; theoretical values C:54.97, H:3.59, N:10.68; found values C:55.06, H:3.41, N:10.63.

EXAMPLE 17

To a solution of 12 ml of acetic acid and 40 ml of concentrated hydrochloric acid was added 0.6 g of 1-(m-trifluoromethylphenyl)-3-ethoxycarbonylmethyl-pyrido[2,3-d]pyrimidine-2,4(1H,3H)-dione and the mixture was reacted for 20 hour. The solvent was then distilled off under reduced pressure, the residue was recrystallized from methanol and water, 0.46 g of colorless prisms of 1-(m-trifluoromethylphenyl)-3-carboxymethylpyrido[2,3-d]pyrimidine-2,4(1H,3H)-dione was obtained.

Melting point 186°–188°C.

Ultimate analysis value $C_{16}H_{40}F_3N_3O_4$; theoretical valuesC:52.61, H:2.76, N:11,51; found values C:52.41, H:2.82, N:11.35.

EXAMPLE 18

To a solution of 2.7 g of 1-(m-chlorophenyl)-pyrido[2,3-d]pyrimidine2,4(1H,3H)-dione and 30 ml of dried dimethylformamide was added 0.72 g of 50 % sodium hydride and the mixture was stirred for one hour at room temperature. Then 2.5 g of ethyl chloroacetate was further added and the mixture was reacted 1.5 hours at room temperature. The solvent was then distilled off under reduced pressure; to the residue was added water and upon recrystallization from methanol, 3.1 g of colorless prisms of 1-(m-chlorophenyl)-3-ethoxycarbonylmethylpyrido[2,3-d]pyrimidine-2,4-(1H,3H)-dione was obtained.

Melting point 131°–132°C

Ultimate analysis value $C_{17}H_{14}ClN_3O_4$; theoretical values C:56.75, H:3.92, N:11.68; found values C:56.53, H:3.81, N:11.56.

EXAMPLE 19

To a solution of 1.0 g of 1-(m-trifluoromethyl-phenyl)pyrido[2,3-d] pyrimidine-2,4(1H,3H)-dione and 20 ml dried dimethylformamide was added 0.24 g of 50 % sodium hydride, the mixture was stirred for one hour. Then 1.8 g of ethyl α-bromopropionate was further added and the mixture was reacted for one hour at room temperature. The solvent was then distilled off under reduced pressure; to the residue was added water, and the mixture was extracted with ether. After evaporation of ether, 1.0 g of light yellow oil, 1-(m-trifluoromethylphenyl)-3-(1-ethoxycarbonylmethyl)-pyrido[2,3-d]pyrimidine-2,4(1H,3H)-dione was obtained.

IR : $\nu_{C=O}^{liquid}$ 1750, 1725 and 1680 cm$^{-1}$; mass: parent ion 395.

EXAMPLE 20

To a solution of 20 ml acetic acid and 40 ml concentrated hydrochloric acid was added 1-(m-trifluoromethylphenyl)-3-(1-ethoxycarbonylethyl)pyrido[2,3-d]pyrimidine-2,4(1H,3H)-dione and then the mixture was refluxed for 15 hours. The solvent was then distilled off under reduced pressure, the residue obtained was recrystallized from methanol and water, 0.72 g of colorless prisms of 1-(m-trifluoromethylphenyl)-3-(1-carboxyethyl) pyrido[2,3-d]pyrimidine-2,4(1H,3H)-dione was obtained.

Melting point 202°–204°C.

Ultimate analysis value $C_{17}H_{12}F_3N_3O_4$; theoretical values C:53.83, H:3.19, N:11.08; found values C:53.62, H:3.05, N:11.21.

EXAMPLE 21

To a solution of 0.2 of 1-(m-trifluoromethylphenyl)-pyrido[2,3-d] pyrimidine-2,4(1H,3H)-dione and 20 ml dried dimethylformamide was added 0.05 g of 50 % sodium hydride, the mixture was stirred for 0.5 hour. Then 0.1 g of chloroacetonitrile was added and the mixture was reacted for 2 hours at room temperature. The solvent was then distilled off under reduced pressure, and to the residue was added water. The crystals produced were filtered and dried, and upon recrystallization from methanol 0.2 g of colorless prisms of 1-(m-trifluoromethylphenyl)-3-cyanomethylpyrido[2,3-d]pyrimidine-2,4(1H,3H)-dione was obtained.

Melting point 219°–220°C

Ultimate analysis value $C_{16}H_9F_3N_4O_2$; theoretical values C:55.51, H:2.62, N:16.18; found values C:55.23, H:2.92, N:16.42.

EXAMPLE 22

To a solution of 2.7 g of 1-(2,3-xylyl)pyrido[2,3-d]pyrimidine-2,4(1H,3H)-dione and 30 ml dried dimethylformamide was added 0.7 g of 50 % sodium hydride, and the mixture was stirred for 0.5 hour. Then 3.1 g of ethyl chloroacetate was further added and the mixture was reacted for 1.5 hours at room temperature. The solvent was then distilled off under reduced pressure, to the residue was added water and the crystals produced were recrystallized from methanol, 3,2g of colorless prisms of 1-(2,3-xylyl)-3-ethoxycarbonylmethylpyrido[2,3-d]pyrimidine-2,4(1H,3H)-dione was obtained.

Melting point 196°–197°C Ultimate analysis value $C_{19}H_{19}N_3O_4$; theoretical values C:64.58, H:5.42, N:11.89; found values C:64.61,H:5.38, N:11.78.

EXAMPLE 23

A misture of 0.5 g of 1-(m-trifluoromethylphenyl)-pyrido[2,3-d]pyrimidine-2,4(1H,3H)-dione, 1 g of dimethylsulfate and 30 ml of acetone was refluxed for 12 hours. The residue was neutralized by 10 % sodium carbonate solution under cooling, and the crystals precipitated was filtered. Upon recrystallization from methanol, 0.45 g of colorless prisms of 1-(m-trifluoromethylphenyl)-3-methylpyrido[2,3-d]pyrimidine-2,4(1H,3H)-dione was obtained.

Melting point 221°–222°C

Ultimate analysis value $C_{15}H_{10}F_3N_3O_2$; theoretical values C:56.08, H:3.14, N:13.08; found values C:56.13, H:3.21, N:13.17.

EXAMPLE 24

To a solution of 1g of 1-phenylpyrido[2,3-d]pyrimidine-2,4(1H,3H)-dione in 20 ml of dimethylformamide was added 0.25 g of 50 % sodium hydride, the mixture was reacted for 30 minutes with stirring. Then 1.2 g of diethyl sulfate was further added and the mixture was reacted for one hour at room temperature. The solvent was distilled off under reduced pressure, and the residue was neutralized with 10 % sodium carbonate solution under cooling. The crystals produced were recrystallized from methanol to give 0.8 g of colorless needles of 1-phenyl-3-ethylpyrido[2,3-d]pyrimidine-2,4(1H,3H)-dione.

Melting point 192°–193°C.

Ultimate analysis value $C_{15}H_{13}N_3O_2$; theoretical values C:67.40, H:4.90, N:15.72; found values C:67.25, H:4.94, N:15.63.

EXAMPLE 25

A mixture of 2.7 g of 1(m-chlorophenyl)pyrido[2,3-d]pyrimidine-2,4(1H,3H)-dione and 1.18 g of dimethyl oxalate was heated for 70 hours at 210°–220°C in a sealed tube. To the mixture was added 30 ml of chloroform and the insoluble material was filtered off, and the filtrate was concentrated to dryness under reduced pressure. Upon recrystallization from methanol, 1.5 g of colorless prisms of 1-(m-chlorophenyl)-3-methyl-pyrido[2,3-d]pyrimidine-2,4(1H,3H)-dione was obtained.

Melting point 239°–240°C

Ultimate analysis value $C_{14}H_{10}ClN_3O_2$ theoretical values C:58.44, H:3.50, N:14.61, found values C:58.48, H:3.52, N:14.58.

EXAMPLE 26

To 30 ml of benzene were successively added 3.1 g of 1-(m-trifluoromethylphenyl)pyrido[2,3-d]pyrimidine-2,4(1H,3H)-dione, 0.48 g of sodium hydride and 12 g of diethyl carbonate. The mixture was heated in an autoclave at 200°C for 4 hours and then concentrated under reduced pressure. To the residue was added 50 ml of chloroform and the insoluble material was filtered off. The solvent was distilled off to give crystals. Upon recrystallization from methanol, 2.8 g of colorless prisms of 1-(m-trifluoromethylphenyl)-3-ethyl-pyrido[2,3-d]pyrimidine-2,4(1H,3H)-dione was obtained.

Melting point 161°–162°C.

Ultimate analysis value $C_{16}H_{12}F_3O_2$; theoretical values C:57.31, H:3.61, N:12.53; found values C:57.45, H:3.82, N:12.62.

EXAMPLE 27

To a solution of 2.7 g of 1-(m-chlorophenyl)-pyrido[2,3-d]pyrimidine-2,4(1H,3H)-dione in 20 ml dimethylformamide was added 1.8 g of ethylene carbonate, and the mixture was reacted for 1.5 hours at 145°–155°C on an oil bath. The solvent was removed off under reduced pressure, and to the residue was added ice water. The crystals produced were filtered, and upon recrystallization from the mixed solvent of ether and petroleum ether, 2.5 g of colorless prisms of 1-(m-chlorophenyl)-3-(2-hydroxyyethyl)pyrido [2,3-d]pyrimidine-2,4(1H,3H)-dione was obtained.

Melting point 176°–177°C.

Ultimate analysis value $C_{15}H_{12}N_3O_3Cl$; theoretical values C:56.70, H:3.81, N:13.23; found values C:56.53, H:3.73, N:13.31.

EXAMPLE 28

To a solution of 1 g of 1-(m-trifluoromethylphenyl)-pyrido[2,3-d] pyrimidine-2,4(1H,3H)-dione and 10 ml dimethylformamide was added 1.7 g of proplylene carbonate, and the mixture was refluxed for 3 hours. The solvent was removed off under reduced pressure, and the residue was extracted with ether. Evaporation of the solvent from the ether extracts gave 0.82 g of colorless prisms of 1-(m-trifluoromethylphenyl)-3-(2-hydroxypropyl)pyrido[2,3-d]pyrimidine-2,4(1H,3H)-dione.

Melting point 167°–169°C.

Ultimate analysis value $C_{17}H_{14}N_3O_3F_3$; theoretical values C:55.89, H:3.86, N:11.50; found values C:55.73, H:3.76, N:11.45.

EXAMPLE 29

To a solution of 1.3 g of 1-(2,3-xylyl)pyrido[2,3-d]pyrimidine-2,4 (1H,3H)-dione in 15 ml of dimethylformamide was added 0.84 g of ethylene carbonate, and the mixture was reacted for one hour at 150°–155°C. To the residue was added water and the crystals obtained were filtered. Upon recrystallization from the mixed solvent of methanol and water, 1.1 g of colorless prisms of 1-(2,3-xylyl)-3-(2-hydroxyethyl)-pyrido[2,3-d)]pyrimidine-2,4(1H,3H)-dione was obtained.

Melting point 193°–195°C.

Ultimate analysis value $C_{17}H_{17}N_3O_3$; theoretical values C:65.58, H:5.50, N:13.50; found values C:65.42, H:5.61, N:13.32.

EXAMPLE 30

To a solution of 2 g of 1-(m-trifluoromethylphenyl)-pyrido[2,3-d] pyrimidine-2,4(1H,3H)-dione in 20 ml of dimethylformamide were added 8 ml of glycol sulfide and 8 ml of pyridine, and the mixture was allowed to stand for 40 hours at room temperature. The solvent was removed off under reduced pressure. The residue was extracted with ether. The ether extracts were washed with water and dried with sodium sulfate and concentrated. The residue was allowed to stand at room temperature to yield 1.9 g of colorless prisms of 1-(m-trifluoromethylphenyl)-3-(2-hydroxyethyl)-pyrido [2,3-d]pyrimidine-2,4(1H,3H)-dione.

Melting point 142°–143°C

Ultimate analysis value $C_{16}H_{12}N_3O_3F_3$; theoretical values C:54.70, H:3.44, N:11.96; found values C:56.62, H:3.43, N:11.87.

EXAMPLE 31

To a solution of 1 g of 1-(m-trifluoromethylphenyl)-pyrido[2,3-d]pyrimidine -2,4(1H,3H)-dione and 15 ml of dimethylformamide were added 4 ml of pyridine and 4 ml of propyleneoxide, and the mixture was stirred for 24 hours at room temperature. The solvent was distilled off under reduced pressure, to the residue was added water. The oily product obtained was extracted with ether. After concentration of the extracts, 0.92 g of colorless prisms of 1-(m-trifluoromethylphenyl)-3-(2-hydroxypropyl)pyrido[2,3-d]pyrimidine-2,4(1H,3H)-dione was obtained.

Melting point 167°–169°C.

Ultimate analysis value $C_{17}H_{14}F_3N_3O_3$; theoretical values C:55.89, H:3.86, N:11.50; found values C:55.73, H:3.78, N:11.43.

EXAMPLE 32

To a solution of 1 g of 1-(2,3-xylyl)pyrido[2,3-d]pyrimidine-2,4(1H,3H)-dione and 15 ml of dimethylformamide were added 4 ml of pyridine and 4 ml of ethyleneoxide, and the mixture was stirred for 24 hours at room temperature. The solvent was distilled off under reduced pressure, to the residue was added water. The crystals produced were filtered, and upon recrystallization from methanol, 0.8 g of colorless prisms of 1-(2,3-xylyl)-3-(2-hydroxyethyl) pyrido[2,3-d]pyrimidine-2,4(1H,3H)-dione was obtained.

Melting point 193°–195°C.

Ultimate analysis value $C_{17}H_{17}N_3O_3$; theoretical values C:65.58, H:5.50, N:13.50; found values C:65.37, H:5.52, N:13.47.

EXAMPLE 33

To a solution of 3.1 g of 1-(m-trifluoromethyl)-pyrido[2,3-d]pyrimidine-2,4(1H,3H)-dione in 30 ml of methanol and 20 ml of chloroform was added dropwise 50 ml of diazomethane-ether solution (about 2%) with stirring under ice-cooling, and the mixture was allowed to stand for 5 hours at room temperature and then heated for one hour at 55°–60°C. After reaction, the solvent was distilled off and 3.1 g of colorless prisms of 1-(m-trifluoromethylphenyl)-3-methylpyrido[2,3-d]pyrimidine-2,4(1H,3H)-dione was obtained.

Melting point 222°–223°C.

Ultimate analysis value $C_{15}H_{10}F_3N_3O_2$; theoretical values C:56.08, H:3.14, N:13.08; found values C:56.12, H:3.10, N:13.06.

EXAMPLE 34

To a solution of 50 ml of ethyl alcohol and 1.7 g of metallic sodium were added 3.7 g of 2-(m-chloroanilino)nicotinamide and 8.7 g of diethyl carbonate. The mixture was refluxed for 1.5 hours. The reaction mixture was neutralized with acetic acid and added water. The crystals produced were filtered, and upon recrystallization from methanol, 3.6 g of colorless prisms of 1-(m-chlorophenyl)pyrido[2,3-d]pyrimidine-2,4(1H,3H)-dione was obtained.

Melting point 247°–248°C.

Ultimate analysis value $C_{13}H_8O_2N_3Cl$; theoretical values C:57.05, H:2.95, N:15.36; found values C:57.32, H:2.97, N:15.21.

EXAMPLE 35

To a solution of 50 ml of ethyl alcohol and 2.3 g of metallic sodium, were added 3.6 g of 2-anilinonicotinamide and 12.0 of diethyl carbonate. The mixture was allowed to stand for one hour at room temperature and neutralized with 10 % hydrochloric acid. The crystals produced were recrystallized from dimethylformamide, 3.4 g of colorless needles of 1-phenylpyrido[2,3-d]pyrimidine-2,4(1H,3H)-dione was obtained.

Melting point above 315°C.

Ultimate analysis value $C_{13}H_9O_2N_3$ ; theoretical values C:65.25, H:3.79, N:17.57; found values C:65.12, H:3.71, N:17.45.

IR : $\nu_{C=O}{}^{KBr}$ 1718, 1692 cm$^{-1}$ ; mass : parent ion 239.

EXAMPLE 36

To a solution of 3.2 g of 2-(2-methyl-3-chloroanilino)nicotin-n-butylamide in 25 ml of dried tetrahydrofuran were added 0.6 g of sodium hydride and 5.9 g of diethyl carbonate and the mixture was refluxed for 12 hours. The solvent was then distilled off under reduced pressure and to the residue was added water. The crystals produced were filtered, and upon recrystallization from the mixed solvents of ether and petroleum benzine, 2.9 g of colorless prisms of 1-(2-methyl-3-chlorophenyl)-3-n-buthylpyrido[2,3-d]pyrimidine-2,4(1H,3H)-dione was obtained.

Melting point 156°–158°C

Ultimate analysis value $C_{18}H_{18}ClN_3O_2$; theoretical values C:62.88, H:5.28, N:12.21; found values C:62.75, H:5.23, N:12.16.

EXAMPLE 37

To a solution of 2.3 g of 2-anilinonicotinmethylamide in 18 ml of dried diglyme were added 0.6 g of 50 % sodium hydride and 5.9 g of diethyl carbonate, and the mixture was refluxed for 12 hours. The solvent was distilled off under reduced pressure and to the residue was added water. The crystals produced were filtered, and upon recrystallization from methanol, 1.8 g of colorless prisms of 1-phenyl-3-methylpyrido[2,3-d]pyrimidine-2,4(1H,3H)-dione was obtained.

Melting point 251°–252°C.

Ultimate analysis value $C_{14}H_{11}N_3O_2$; theoretical values C:66.40, H:4.38, N:16.59; found values C:66.38, H:4.29, N:16.43.

EXAMPLE 38

To a solution of 3.1 g of 2-(m-trifluoromethylanilino)nicotinethylamide and 50 ml of tetrahydrofuran were added 1 g of 50 % sodium hydride and 4.9g of 1, 1'-carbonyldiimidazole. Then the mixture was stirred for one hour at room temperature and refluxed for 5 hours. The solvent was distilled off under reduced pressure and to the residue was added ice water. The crystals produced were recrystallized from methanol to give 2.1 g of colorless prisms of 1-(m-trifluoromethylphenyl)-3-ethylpyrido[2,3-d]pyrimidine-2,4(1H,3H)-dione.

Melting point 163°–164°C

Ultimate analysis value $C_{16}H_{12}F_3N_3O_2$; theoretical values C:57.31, H:3.61, N:12.83; found values C:57.45, H:3.82, N:12.62.

EXAMPLE 39

To a solution of 2.8 g of 2-(m-trifluoromethylanilino)nicotinamide in 25 ml of tetrahydrofuran was added 0.48 g of 50 % sodium hydride, and the mixture was stirred for 15 minutes at room temperature, and then 5.4 g of ethyl chlorocarbonate was further added dropwise under cooling. Then the solution was allowed to stand for one hour and refluxed for 10 hours. The solvent was distilled off under reduced pressure and to the residue was added water and the crystals obtained were recrystallized from the mixed solvent of dimethylformamide and methanol to yield 1.5 g of colorless prisms of 1-(m-trifluoromethylphenyl)-pyrido[2,3-d]pyrimidine-2,4(1H,3H)-dione.

Melting point 259°–260°C Ultimate analysis value $C_{14}H_8F_3N_3O_2$; theoretical values C:54.73, H:2.62, N:13.67; found values C:54.69, H:2.53, N:13.58.

EXAMPLE 40

To a solution of 2.6 g of 2-(m-fluoroanilino)nicotinethylamide in 25 ml of tetrahydrofuran was added 0.48 g of 50 % sodium hydride and the mixture was stirred for 30 minutes at room temperature, and 5.4 g of ethyl chlorocarbonate was further added dropwise under cooling and then refluxed for 10 hours. The solvents was distilled off under reduced pressure and to the residue was added water and the crystals obtained were recrystallized from methanol to give 1.3 g of colorless prisms of 1-(m-fluorophenyl)-3-ethylpyrido[2,3-d]pyrimidine-2,4(1H,3H)-dione.

Melting point 164°–165°C

Ultimate analysis value $C_5H_{12}FN_3O_2$; theoretical values C:63.15, H:4.24, N:14.73; found values C:63.08, H:4.11, N:14.64.

EXAMPLE 41

To a solution of 3.1 g of 2-(m-trifluoromethylanilino)nicotinethylamide in 25 ml of tetrahydrofuran was added 1.1 g of 50 % sodium hydride, and the mixture was stirred for 30 minutes at room temperature. Then a solution of 30 % phosgene and toluene was slowly added dropwise to the mixture under cooling. The solution was stirred for one hour at room temperature. The solvents were distilled off under reduced pressure and to the residue was added water and then the crystals obtained were recrystallized from methanol to give 2.9 g of colorless prisms of 1-(m-trifluoromethylphenyl)-3-ethylpyrido[2,3-d]pyrimidine-2,4(1H,3H)-dione.

Melting point 160°–161°C.

Ultimate analysis value $C_{16}H_{12}F_3N_3O_2$; theoretical values C:57.31, H:3.61, N:12.53; found values C:57.60, H:3.59, N:12.42

EXAMPLE 42

To a solution of 3.1 g of ethyl 2-(m-trifluoromethylanilino)nicotinate in 20 ml of dimethylformamide was added 0.4 g of 55 % sodium hydride and the mixture was stirred for one hour at room temperature, and then 10.3 g of N-methyl urethan was added and reacted for 20 hours at 100°C. The precipitates was filtered off and the filtrate was concentrated under reduced pressure and then to the residue was added water. The crystals obtained were recrystallized from methanol to yield 1.9 g of colorless prisms of 1-(m-trifluoromethylphenyl)-3-methylpyrido[2,3-d]pyrimidine-2,4(1H,3H)-dione.

Melting point 224°–225°C.

Ultimate analysis value $C_{15}H_{10}F_3N_3O_2$; theoretical values C:56.08, H:3.14, N:13.08; found values C:56.12, H:3.10, N:13.06.

EXAMPLE 43

To a solution of 2.76 g of ethyl 2-(m-chloroanilino)-nicotinate in 20 ml dimethylformamide was added 0.48 g of 50 % sodium hydride and the mixture was stirred for one hour at room temperature and then 6 g of urea was further added and reacted for 15 hours at 160°C. The precipitates was filtered off and the filtrate was concentrated under reduced pressure. To the residue was added water and the crystals obtained were recrystallized from methanol to yield 1.8 g of colorless needles of 1-(m-chlorophenyl)pyrido[2,3-d] pyrimidine-2,4(1H,3H)-dione.

Melting point 247°–248°C.

Ultimate analysis value $C_{13}H_8ClN_3O_2$; theoretical values C:57.05, H:2.95, N:15.35; found values C:57.01, H:2.93, N:15.38.

EXAMPLE 44

To a solution of 2.6 g of ethyl 2-(m-fluoroanilino)-nicotinate in 20 ml of dimethylformamide was added 0.48 g of 55 % sodium hydride and the mixture was stirred for one hour at room temperature, and 8.9 g of urethane was further added and refluxed for 15 hours. The precipitates was filtered off and the filtrate was concentrated under reduced pressure. To the residue was added water and the crystals obtained were recrystallized from methanol to give 1.6 g of colorless prisms of 1-(m-fluorophenyl)pyrido-[2,3-d]pyrimidine-2,4(1H,3H)-dione.

Melting point above 315°C.

Ultimate analysis value $C_{13}H_8FN_3O_2$; theoretical values C:60.71, H:3.14, N:16.33; found values C:60.72, H:3.02, N:16.36.

EXAMPLE 45

To a solution of 2.8 g of ethyl 2-(m-chloroanilino)-nicotinate in 20 ml of dimethylformamide was added 0.48 g of 55 % sodium hydride, and the mixture was stirred for one hour at room temperature, and 11.7 g of N-ethyl urethane was further added and reacted for 15 hours at 100°C. The precipitates was filtered and the filtrate was concentrated under reduced pressure. To the residue was added water and the crystals obtained were recrystallized from methanol to give 1.8 g of colorless prisms of 1-(m-chlorophenyl)-3-ethylpyrido[2,3-d]pyrimidine-2,4(1H,3H)-dione.

Melting point 176°–177°C.

Ultimate analysis value $C_{15}H_{12}ClN_3O_2$; theoretical values C:59.71, H:4.01, N:13.92; found values C:59.69, H:3.99, N:13.89.

EXAMPLE 46

To a mixture of 2.7 g of 1-(p-chlorophenyl)-pyrido[2,3-d]pyrimidine-2,4 (1H,3H)-dione with 30 ml of dry dimethylformamide was added 0.5 g of approximately 50 % sodium hydride and the mixture was stirred for 30 minutes. To the mixture was further added 2.7 g cyclopropylmethylbromide and the resultant mixture was stirred for 2 hours at room temperature. After the reaction was completed, the solvent was distilled off from the mixture under reduced pressure, and to the residue obtained was added water to precipitate a crude solid. Recrystallization of this product from methanol gave 3.0 g of pure 1-(p-chlorophenyl)-3-cyclopropylmethylpyrido[2,3-d]pyrimidine-2,4 (1H,3H)-dione as colorless needles, of which melting point and ultimate analysis value were as follows:

Melting point 194°–195°C.

Ultimate analysis value $C_{18}H_{15}ClN_2O_2$; theoretical values C:66.16, H:4.63, N:8.57; found values C:65.97, H:4.57, N:8.59.

EXAMPLE 47

To a mixture of 2.6 g of 1-(p-fluorophenyl)-pyrido[2,3-d]pyrimidine-2,4 (1H,3H)-dione and 40 ml of dry dimethylformamide was added 0.5 g of approximately 50 % of sodium hydride and the mixture was stirred for 30 minutes. Then the mixture was heated to 100°C, and to this was further added 7.6 g of p-toluenesulfonic acid 2,2,2-trifluoroethyl ester and heating was continued for 2 hours with stirring. After the reaction was completed, the solvent was evaporated from the mixture under reduced pressure to leave the residue, to which was added water to precipitate a crude product.

Recrystallization of this product from a mixture of methanol and petroleum ether afforded 2.4 g of pure 1-(p-fluorophenyl)-3-(2,2,2-trifluoroethyl)pyrido[2,3-d]pyrimidine-2,4(1H,3H)-dione as colorless prisms, of which melting point and ultimate analysis value were as follows:

Melting point 172°–173°C.

Ultimate analysis value $C_{15}H_9F_4N_3O_2$; theoretical values C:53.10, H:2.67, N:12.39; found values C:53.27, H:2.82, N:12.47.

EXAMPLE 48

3.2 g of 2-(p-bromoanilino)nicotinic acid ethylamide was dissolved in 30 ml of dry tetrahydrofuran. To the solution was added 1.0 g of approximately 50 % sodium hydride and the mixture was stirred for 30 minutes at room temperature. To the mixture was added dropwise under cooling 10 g of approximately 30 % carbon tetrachloride-phosgene solution and stirring was continued for one hour during which time the mixture was cooled. After the reaction was completed, the excess of phosgene was decomposed with approximately 10 % acetone-ammonia solution, and the solvent was distilled off from the reaction mixture. To the residue was added water and a crude product was produced. Recrystallization of this product from acetone gave 2.9 g of pure 1-(p-bromophenyl)-3-ethylpyrido[2,3-d]pyrimidine-2,4(1H,3H)-dione as colorless needles, of which melting point and ultimate analysis value were as follows:

Melting point 240°–241°C.

Ultimate analysis value $C_{15}H_{12}BrN_3O_2$; theoretical values C:52.04, H:3.49, N:12.13; found values C:52.06, H:3.38, N:12.16.

EXAMPLE 49

To a solution consisting of 3.4 g of 2-(m-trifluoromethylanilino) nicotinic acid cyclopropylmethylamide and 25 ml of tetrahydrofuran was added 0.5 g of 50 % sodium hydride and the mixture was stirred for 15 minutes at room temperature. To this was added dropwise under cooling 5.4 g of ethyl chlorocarbonate and the resultant mixture was allowed to stand for one hour and then refluxed for 10 hours. After the reaction was completed, the solvent was evaporated from the mixture under reduced pressure, and to the residue obtained was added water to form a precipitate. This precipitate was recrystallized from a mixture of ether and petroleum ether to yield 2.9 g of pure 1-(m-trifluoromethylphenyl)-3-cyclopropylmethylpyrido[2,3-d] pyrimidine-2,4(1H,3H)-dione as colorless needles, of which melting point and ultimate analysis value were as follows:

Melting point 149°–150°C.

Ultimate analysis value $C_{18}H_{14}F_3N_3O_2$; theoretical values C:59.83, H:3.91, N:11.63; found values C:59.69, H:3.88, N:11.72.

EXAMPLE 50

To a solution consisting of 2.7 g of 2-anilinonicotinic acid cyclopropylmethylamide and 20 ml of dry dimethylformamide was added 0.52 g of sodium amide and the mixture was stirred for one hour. To the mixture was added dropwise under cooling 3.6 g of phenylisocyanate. The resultant mixture was allowed to stand for one hour at room temperature and for additional one hour at 60°C and further reacted for 5 hours during which time the temperature was raised to 100°C. Then, the solvent was distilled off under reduced pressure to leave the residue, to which was added water to precipitate a crude product. Recrystallization of this product from methanol afforded 2.4 g of pure 1-phenyl-3-cyclopropylmethylpyrido[2,3-d]pyrimidine-2,4(1H,3H)-dione as colorless needles, of which melting point and ultimate analysis value were as follows:

Melting point 213°–214°C.

Ultimate analysis value $C_{17}H_{15}N_3O_2$; theoretical values C:69.61, H:5.15, N:14.33; found values C:69.91, H:5.17, N:14.34.

EXAMPLE 51

To a mixture consisting of 2.5 g of 1-(m-tolyl)-pyrido[2,3-d] pyrimidine-2,4(1H,3H)-dione and 40 ml of dry dimethylformamide was added 0.5 g of 50 % sodium hydride and the mixture was stirred for one hour. Then the mixture was heated at 50°C and to this was further added 2.7 g of cyclopropylmethylbromide and heating was continued for 3 hours with stirring. After the reaction was completed, the solvent was distilled off from the mixture and to the residue thus obtained was added water to yield a precipitate. This precipitate was separated by filtration and recrystallized from methanol to give 2.6 g of pure 1-(m-tolyl)-3-cyclopropylmethylpyrido[2,3-d]pyrimidine-2,4(1H,3H)-dione as colorless needles, of which melting point and ultimate analysis value were as follows:

Melting point 186°–188°C.

Ultimate analysis value $C_{18}H_{17}N_3O_2$; theoretical values C:70.34, H:5.58, N:13.67; found values C:70.18, H:5.47, N:13.71.

EXAMPLE 52

To a mixture containing 2.7 g of 1-(m-chlorophenyl)-pyrido[2,3-d]pyrimidine-2,4(1H,3H)-dione and 40 ml of dry dimethylformamide was added 0.5 g of 50 % sodium hydride and the mixture was stirred for one hour. The mixture was heated to 100°C and to this was added 5.0 g of p-toluenesulfonic acid 2,2,2-trifluoroethyl ester, and heating was further continued for 3 hours with stirring. After the reaction was completed, the mixture was distilled under reduced pressure to remove the solvent. The residue thus obtained was diluted with water and then extracted with ether. The ether layer was dehydrated and concentrated to precipitate a product. This product was isolated by filtration to give 3.0 g of pure 1-(m-chlorophenyl)-3-(2,2,2-trifluoroethyl)-pyrido[2,3-d]pyrimidine-2,4(1H,3H)-dione as colorless needles, of which melting point and ultimate analysis value were as follows:

Melting point 192°–193°C.

Ultimate analysis value $C_{15}H_9N_3O_2F_3Cl$; theoretical values C:50.65, H:2.55, N:11.81; found values C:50.53, H:2.52, N:11.84.

EXAMPLE 53

To a mixture consisting of 3.2 g of 1-(m-bromophenyl)pyrido[2,3-d]pyrimidine-2,4(1H,3H)-dione and 40 ml of dry dimethylformamide was added 0.5 g of 50 % sodium hydride and the mixture was stirred for one hour. The mixture was heated at 100°C and to this was added 4.6 g of p-toluenesulfonic acid cyclopropylmethyl ester, and heating was continued for 1.5 hour with stirring. After the reaction was completed, the solvent was evaporated from the mixture. Too the residue thus obtained was added water to precipitate a crude solid. Recrystallization of this product from ether yielded 3.1 g of pure 1-(m-bromophenyl)-3-cyclopropylmethylpyrido[2,3-d]pyrimidine-2,4(1H,3H)-dione as colorless needles, of which melting point and ultimate analysis were as follows:

Melting point 163°–165°C.

Ultimate analysis value $C_{17}H_{14}N_3O_2Br$; Theoretical values C:54.85, H:3.79, N:11.29; Found values C:54.71, H:3.67, N:11.13.

EXAMPLE 54

To a solution of 3.2 g of 1-(m-bromophenyl)-pyrido[2,3-d]pyrimidine-2,4 (1H,3H)-dione and 30 ml of dimethylformamide was added 0.5 g of sodium hydride and the mixture was stirrted for one hour at room temperature. To the mixture was added 4.3 g of isopropyliodide and this was reacted for 2 hours with stirring at room temperature. After the reaction was completed, the solvent was evaporated from the mixture under reduced pressure. To the residue obtained was added water to precipitate a crude product. Recrystallization of this product from methanol yielded 3.3 g of pure 1-(m-bromophenyl)-3-isopropylpyrido[2,3-d]pyrimidine-2,4(1H,3H)-dione as colorless prisms, of which melting point and ultimate analysis value were as follows:

Melting point 180°–181°C.

Ultimate analysis value $C_{16}H_{14}BrN_3O_2$; theoretical values C:53.35, H:3.92, N:11.67; found values C:53.28, H:3.84, N:11.62.

EXAMPLE 55

3.0 g of 2-(m-methoxyanilino)nicotinic acid cyclopropylmethylamide was dissolved in 30 ml of tetrahydrofuran. To the solution was added 1.0 g of sodium hydride and the mixture was stirred for 30 minutes at room temperature. Then to the mixture was added dropwise 12 g of 30 % phosgene-carbon tetrachloride solution under cooling and stirring was continued for one hour. After the reaction was completed, the excess of phosgene was decomposed with 10 % acetoneammonia solution, and the solvent was then evaporated from the mixture under reduced pressure. To the residue thus obtained was added water to precipitate a crude solid. Recrystallization of this product from methanol yielded 2.2 g of the colorless needles, 1-(m-methoxyphenyl)-3-cyclopropylmethylpyrido[2,3-d]pyrimidine-2,4(1H,3H)-dione.

Melting point 214°–216°C.

Ultimate analysis value $C_{18}H_{17}N_3O_3$; theoretical values C:66.86, H:5.30, N:13.00; found values C:66.78, H:5.28, N:12.97.

EXAMPLE 56

To a solution containing 3.0 g of 2-(3,4-dichloroanilino)nicotinic acid methylamide and 30 ml of dry diglyme was added 0.6 g of sodium hydride and the mixture was stirred for 30 minutes. To the mixture was further added 5.9 g of diethylcarbonate and this was reacted for 12 hours under reflux. After the reaction was completed, the solvent was evaporated from the mixture under reduced pressure, and to the residue thus obtained was added water to precipitate a crude product. This product was recrystallized to yield 2.6 g of the colorless prisms, 1-(3,4-dichlorophenyl)-3-methylpyrido [2,3-d]pyrimidine-2,4(1H,3H)-dione.

Melting point 260°–261°C.

Ultimate analysis value $C_{14}H_9Cl_2N_3O_2$; theoretical values C:52.19, H:2.82, N:13.04; found values C:52.12, H:2.80, N:12.92.

What is claimed is:

1. A compound of the formula

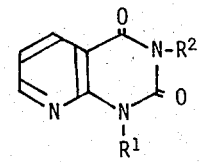

wherein $R^1$ is selected from the group consisting of phenyl, halophenyl, dihalophenyl, tolyl and trifluoromethylphenyl; $R^2$ is selected from the group consisting of hydrogen, alkyl groups having from one to 3 carbon atoms, alkenyl group having from 3 to 5 carbon atoms, propargyl, cyclopropylmethyl, haloethyl, dihalomethyl, trihaloalkyl groups having from one to 2 carbon atoms, hydroxyalkyl groups having from 2 to 3 carbon atoms, acetoxyethyl, alkoxyalkyl groups having from 2 to 4 carbon atoms and 2-(2-hydroxyethoxy)ethyl.

2. 1-(m-trifluoromethylphenyl)-3-methylpyrido[2,3-d]pyrimidine-2,4(1H,3H)-dione in accordance with claim 1.

3. 1-(m-trifluoromethylphenyl)-3-ethylpyrido[2,3-d]pyrimidine-2,4(1H,3H)-dione in accordance with claim 1.

4. 1-(m-trifluoromethylphenyl)-3-allylpyrido[2,3-d]pyrimidine-2,4(1H,3H)-dione in accordance with claim 1.

5. 1-(m-trifluoromethylphenyl)-3-(2-chloroethyl)-pyrido[2,3-d]pyrimidine-2,4(1H,3H)-dione in accordance with claim 1.

6. 1-(m-trifluoromethylphenyl)-3-(2-bromoethyl)-pyrido[2,3-d]pyrimidine-2,4(1H,3H)-dione in accordance with claim 1.

7. 1-(m-trifluoromethylphenyl)-3-(2-hydroxyethyl)-pyrido[2,3-d]pyrimidine-2,4(1H,3H)-dione in accordance with claim 1.

8. 1-(m-trifluoromethylphenyl)-3-(3-hydroxypropyl)pyrido[2,3-d]pyrimidine-2,4(1H,3H)-dione in accordance with claim 1.

9. 1-(m-trifluoromethylphenyl)-3-(2-hydroxy-n-propyl)pyrido[2,3-d]pyrimidine-2,4(1H,3H)-dione in accordance with claim 1.

10. 1-(m-trifluoromethylphenyl)-3-(2-acetoxyethyl)-pyrido[2,3-d]pyrimidine-2,4(1H,3H)-dione in accordance with claim 1.

11. 1-(m-trifluoromethylphenyl)-3-[2-(2-hydroxyethoxy)ethyl] pyrido[2,3-d] pyrimidine-2,4(1H,3H)-dione in accordance with claim 1.

12. 1-phenyl-3-ethylpyrido[2,3-d]pyrimidine-2,4(1H,3H)-dione in accordance with claim 1.

13. 1-phenyl-3-allylpyrido[2,3-d]pyrimidine-2,4(1H,3H)-dione in accordance with claim 1.

14. 1-phenyl-3-propargylpyrido[2,3-d]pyrimidine-2,4(1H,3H)-dione in accordance with claim 1.

15. 1-phenyl-3-(2-chloroethyl)pyrido[2,3-d]pyrimidine-2,4(1H,3H)-dione in accordance with claim 1.

16. 1-(m-fluorophenyl)-3-ethylpyrido[2,3-d]pyrimidine-2,4(1H,3H)-dione in accordance with claim 1.

17. 1-(m-fluorophenyl)-3-allylpyrido[2,3-d]pyrimidine-2,4(1H,3H)-dione in accordance with claim 1.

18. 1-(m-fluorophenyl)-3-(2-chloroethyl)-pyrido[2,3-d]pyrimidine-2,4(1H,3H)-dione in accordance with claim 1.

19. 1-(m-chlorophenyl)-3-ethylpyrido[2,3-d]pyrimidine-2,4(1H,3H)-dione in accordance with claim 1.

20. 1-(m-bromophenyl)-3-ethylpyrido[2,3-d]pyrimidine-2,4(1H,3H)-dione in accordance with claim 1.

21. 1-(m-bromophenyl)-3-allylpyrido[2,3-d]pyrimidine-2,4(1H,3H)-dione in accordance with claim 1.

22. 1-(m-bromophenyl)-3-propargylpyrido[2,3-d]pyrimidine-2,4(1H,3H)-dione in accordance with claim 1.

23. 1-(m-bromophenyl)-3-(2-chloroethyl)-pyrido[2,3-d]pyrimidine-2,4(1H,3H)-dione in accordance with claim 1.

24. 1-(m-bromophenyl)-3-(2-hydroxyethyl)-pyrido[2,3-d]pyrimidine-2,4(1H,3H)-dione in accordance with claim 1.

25. 1-(m-bromophenyl)-3-methoxymethyl-pyrido[2,3-d]pyrimidine-2,4(1H,3H)-dione in accordance with claim 1.

26. 1-(m-chlorophenyl)-3-(2-hydroxyethyl)-pyrido[2,3-d]pyrimidine-2,4(1H,3H)-dione in accordance with claim 1.

27. 1-(m-chlorophenyl)-3-n-propylpyrido[2,3-d]pyrimidine-2,4(1H,3H)-dione in accordance with claim 1.

28. 1-(m-chlorophenyl)-3-isopropylpyrido[2,3-d]pyrimidine-2,4(1H,3H)-dione in accordance with claim 1.

29. 1-(m-chlorophenyl)-3-allylpyrido[2,3-d]pyrimidine-2,4(1H,3H)-dione in accordance with claim 1.

30. 1-(m-chlorophenyl)-3-propargylpyrido[2,3-d]pyrimidine-2,4(1H,3H)-dione in accordance with claim 1.

31. 1-(m-chlorophenyl)-3-(2-chloroethyl)-pyrido[2,3-d]pyrimidine-2,4(1H,3H)-dione in accordance with claim 1.

32. 1-(m-tolyl)-3-allylpyrido[2,3-d]pyrimidine-2,4(1H,3H)-dione in accordance with claim 1.

33. 1-(m-tolyl)-3-propargylpyrido[2,3-d]pyrimidine-2,4(1H,3H)-dione in accordance with claim 1.

34. 1-phenyl-3-(3-hydroxypropyl)pyrido[2,3-d]pyrimidine-2,4(1H,3H)-dione in accordance with claim 1.

35. 1-(m-fluorophenyl)-3-(3-hydroxypropyl)-pyrido[2,3-d]pyrimidine-2,4(1H,3H)-dione in accordance with claim 1.

36. 1-(m-chlorophenyl)-3-methylpyrido[2,3-d]pyrimidine-2,4(1H,3H)-dione in accordance with claim 1.

37. 1-(m-chlorophenyl)-3-(3-hydroxypropyl)-pyrido[2,3-d]pyrimidine-2,4(1H,3H)-dione in accordance with claim 1.

38. 1-(m-bromophenyl)-3-n-propylpyrido[2,3-d]pyrimidine-2,4(1H,3H)-dione in accordance with claim 1.

39. 1-(m-bromophenyl)-3-(3-hydroxypropyl)-pyrido[2,3-d]pyrimidine-2,4(1H,3H)-dione in accordance with claim 1.

40. 1-(m-iodophenyl)-3-ethylpyrido[2,3-d]pyrimidine-2,4(1H,3H)-dione in accordance with claim 1.

41. 1-(3,4-dichlorophenyl)-3-ethylpyrido[2,3-d]pyrimidine-2,4(1H,3H)-dione in accordance with claim 1.

42. 1-(m-trifluoromethylphenyl)-3-cyclopropylmethylpyrido[2,3-d]pyrimidine-2,4(1H,3H)-dione in accordance with claim 1.

43. 1-(m-trifluoromethylphenyl)-3-(2,2,2-trifluoroethyl)pyrido[2,3-d]pyrimidine-2,4(1H,3H)-dione in accordance with claim 1.

44. 1-(m-trifluoromethylphenyl)-3-(2-ethoxyethyl)-pyrido[2,3-d]pyrimidine-2,4(1H,3H)-dione in accordance with claim 1.

45. 1-phenyl-3-cyclopropylmethylpyrido[2,3-d]pyrimidine-2,4(1H,3H)-dione in accordance with claim 1.

46. 1-phenyl-3-(2,2,2-trifluoroethyl)pyrido[2,3-d]pyrimidine-2,4(1H,3H)-dione in accordance with claim 1.

47. 1-(m-fluorophenyl)-3-cyclopropylmethyl-pyrido[2,3-d]pyrimidine-2,4(1H,3H)-dione in accordance with claim 1.

48. 1-(m-fluorophenyl)-3-(2,2,2-trifluoroethyl)-pyrido[2,3-d]pyrimidine-2,4(1H,3H)-dione in accordance with claim 1.

49. 1-(p-fluorophenyl)-3-ethylpyrido[2,3-d]pyrimidine-2,4(1H,3H)-dione in accordance with claim 1.

50. 1-(p-fluorophenyl)-3-cyclopropylmethyl-pyrido[2,3-d]pyrimidine-2,4(1H,3H)-dione in accordance with claim 1.

51. 1-(p-fluorophenyl)-3-(2,2,2-trifluoroethyl)-pyrido[2,3-d]pyrimidine-2,4(1H,3H)-dione in accordance with claim 1.

52. 1-(m-chlorophenyl)-3-cyclopropylmethyl-pyrido[2,3-d]pyrimidine-2,4(1H,3H)-dione in accordance with claim 1.

53. 1-(m-chlorophenyl)-3-(2,2,2-trifluoroethyl)-pyrido[2,3-d]pyrimidine-2,4(1H,3H)-dione in accordance with claim 1.

54. 1-(m-chlorophenyl)-3-[2-(2-hydroxyethoxy)ethyl]pyrido[2,3-d]pyrimidine-2,4(1H,3H)-dione in accordance with claim 1.

55. 1-(p-chlorophenyl)-3-ethylpyrido[2,3-d]pyrimidine-2,4(1H,3H)-dione in accordance with claim 1.

56. 1-(p-chlorophenyl)-3-cyclopropylmethyl-pyrido[2,3-d]pyrimidine-2,4(1H,3H)-dione in accordance with claim 1.

57. 1-(p-chlorophenyl)-3-(2,2,2-trifluoroethyl)-pyrido[2,3-d]pyrimidine-2,4(1H,3H)-dione in accordance with claim 1.

58. 1-(p-chlorophenyl)-3-(2-chloroethyl)pyrido[2,3-d]pyrimidine-2,4(1H,3H)-dione in accordance with claim 1.

59. 1-(p-chlorophenyl)-3-(2-hydroxyethyl)-pyrido[2,3-d]pyrimidine-2,4(1H,3H)-dione in accordance with claim 1.

60. 1-(m-bromophenyl)-3-methylpyrido[2,3-d]pyrimidine-2,4(1H,3H)-dione in accordance with claim 1.

61. 1-(m-bromophenyl)-3-isopropylpyrido[2,3-d]pyrimidine-2,4(1H,3H)-dione in accordance with claim 1.

62. 1-(m-bromophenyl)-3-cyclopropylmethyl-pyrido[2,3-d]pyrimidine-2,4(1H,3H)-dione in accordance with claim 1.

63. 1-(m-bromophenyl)-3-(3,3-dimethylallyl)-pyrido[2,3-d]pyrimidine-2,4(1H,3H)-dione in accordance with claim 1.

64. 1-(m-bromophenyl)-3-(2,2,2-trifluoroethyl)-pyrido[2,3-d]pyrimidine-2,4(1H,3H)-dione in accordance with claim 1.

65. 1-(p-bromophenyl)-3-ethylpyrido[2,3-d]pyrimidine-2,4(1H,3H)-dione in accordance with claim 1.

66. 1-(p-bromophenyl)-3-cyclopropylmethylpyrido[2,3-d]pyrimidine-2,4(1H,3H)-dione in accordance with claim 1.

67. 1-(p-bromophenyl)-3-(2,2,2-trifluoroethyl)pyrido[2,3-d]pyrimidine-2,4(1H,3H)-dione in accordance with claim 1.

68. 1-(m-iodophenyl)-3-methylpyrido[2,3-d]pyrimidine-2,4(1H,3H)-dione in accordance with claim 1.

69. 1-(m-iodophenyl)-3-cyclopropylmethylpyrido[2,3-d]pyrimidine-2,4(1H,3H)-dione in accordance with claim 1.

70. 1-(m-iodophenyl)-3-allylpyrido[2,3-d]pyrimidine-2,4(1H,3H)-dione in accordance with claim 1.

71. 1-(m-iodophenyl)-3-propargylpyrido[2,3-d]pyrimidine-2,4(1H,3H)-dione in accordance with claim 1.

72. 1-(m-iodophenyl)-3-(2,2,2trifluoroethyl)pyrido[2,3-d]pyrimidine-2,4(1H,3H)-dione in accordance with claim 1.

73. 1-(m-tolyl)-3-cyclopropylmethylpyrido[2,3-d]pyrimidine-2,4(1H,3H)-dione in accordance with claim 1.

74. 1-(m-tolyl)-3-(2,2,2-trifluoroethyl)pyrido[2,3-d]pyrimidine-2,4(1H,3H)-dione in accordance with claim 1.

75. 1-(3,4-dichlorophenyl)-3-methylpyrido[2,3-d]pyrimidine-2,4(1H,3H)-dione in accordance with claim 1.

76. 1-(3,4-dichlorophenyl)-3-cyclopropylmethylpyrido[2,3-d]pyrimidine-2,4(1H,3H)-dione in accordance with claim 1.

77. 1-(3,4-dichlorophenyl)-3-(2,2,2-trifluoroethyl)pyrido[2,3-d]pyrimidine-2,4(1H,3H)-dione in accordance with claim 1.

78. 1-(3,4-dichlorophenyl)-3-(2-chloroethyl)pyrido[2,3-d]pyrimidine-2,4(1H,3H)-dione in accordance with claim 1.

* * * * *

UNITED STATES PATENT AND TRADEMARK OFFICE
CERTIFICATE OF CORRECTION

PATENT NO. : 3,922,275
DATED : November 25, 1975
INVENTOR(S) : Noda et al

It is certified that error appears in the above–identified patent and that said Letters Patent are hereby corrected as shown below:

Column 37, second formula from the top should read

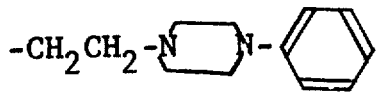

Column 46, line 31, last portion of the formula should read

-2,4(1H,3H)-dione

Column 48, line 57, "misture" should read --mixture--

Column 49, line 50, the formula should read $C_{16}H_{12}F_3N_3O_2$

Column 56, line 66, "Too" should read --To--

Signed and Sealed this

Thirteenth Day of July 1976

[SEAL]

Attest:

RUTH C. MASON
Attesting Officer

C. MARSHALL DANN
Commissioner of Patents and Trademarks